(12) United States Patent
Sawada et al.

(10) Patent No.: US 6,907,470 B2
(45) Date of Patent: Jun. 14, 2005

(54) COMMUNICATION APPARATUS FOR ROUTING OR DISCARDING A PACKET SENT FROM A USER TERMINAL

(75) Inventors: Sunao Sawada, Yokohama (JP); Tatsuya Watanuki, Ebina (JP); Shinji Nozaki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 750 days.

(21) Appl. No.: 09/893,004

(22) Filed: Jun. 28, 2001

(65) Prior Publication Data
US 2002/0016858 A1 Feb. 7, 2002

(30) Foreign Application Priority Data

Jun. 29, 2000 (JP) ....................... 2000-195706

(51) Int. Cl.[7] ......................... G06F 15/173
(52) U.S. Cl. ..................... 709/244; 709/238
(58) Field of Search ................. 709/242, 238, 709/244, 225

(56) References Cited

U.S. PATENT DOCUMENTS

| | | | | |
|---|---|---|---|---|
| 5,749,053 A | * | 5/1998 | Kusaki et al. | 455/524 |
| 6,092,191 A | * | 7/2000 | Shimbo et al. | 713/153 |
| 6,167,444 A | * | 12/2000 | Boden et al. | 709/223 |
| 6,282,575 B1 | * | 8/2001 | Lin et al. | 709/244 |
| 6,523,696 B1 | * | 2/2003 | Saito et al. | 709/223 |
| 6,564,216 B2 | * | 5/2003 | Waters | 707/10 |
| 6,618,761 B2 | * | 9/2003 | Munger et al. | 709/241 |
| 6,745,247 B1 | * | 6/2004 | Kawan et al. | 709/245 |

FOREIGN PATENT DOCUMENTS

| | | | | |
|---|---|---|---|---|
| JP | 11-068765 | 3/1999 | | |
| JP | 2000-174796 | 6/2000 | | |
| WO | WO 9840985 | * | 9/1998 | ............. H04L/9/32 |

* cited by examiner

*Primary Examiner*—Bunjob Jaroenchonwanit
(74) *Attorney, Agent, or Firm*—Mattingly, Stanger, Malur & Brundidge, P.C.

(57) ABSTRACT

A packet communications apparatus of the present invention essentially comprises a plurality of network interfaces (NIFs), a learned address table, a packet forwarding unit (PFU) and a processor for directive packets to change state (PDPCS). The learned address table contains information for identifying a NIF through which to send a packet. The PFU selects a port through which to forward a packet by referring to the learned address table, according to the state of the NIFs, and forwards or discards a packet received from a user terminal. The PDPCS receives a packet including a directive to change the state of a specific NIF to one of the connected state, disconnected state and stateless. The PDPCS changes the state of the specific NIF to one of the connected state, disconnected state and stateless, according to the directive in the packet.

4 Claims, 30 Drawing Sheets

NIF : Network Interface
PDPCS : Processor for Directive Packets to Change State
LA : Learned Address NIF : Network Interface
PDPCS : Processor for Directive
Packets to Change State
LA : Learned Address

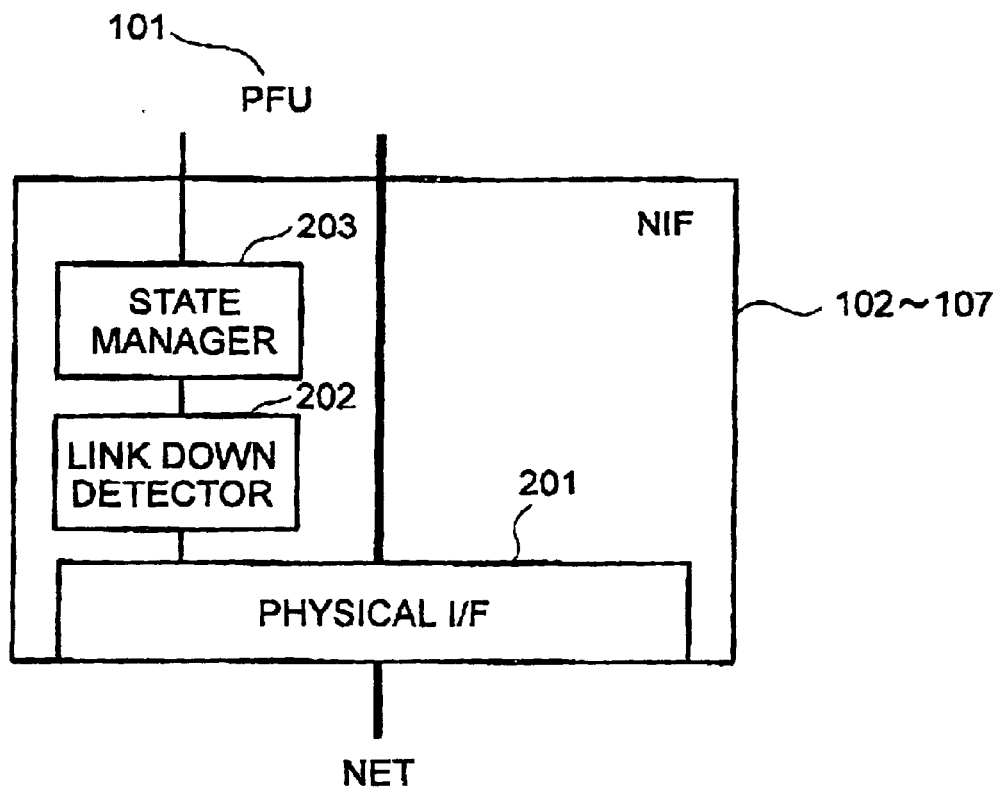

SV-AUTH : Server for Authentication
UT : User Terminal

SV-AUTH : Server for Authentication

LA : Learned Address
NIF : Network Interface
PFU : Packet Forwarding Unit
PDPCS : Processor for Directive Packets to Change State

| # | Address | Sending Port |
|---|---|---|
| 1 | 22:22:00:11:11:11 | A |
| 2 | 22:22:00:22:22:22 | B |
| 3 | 22:22:00:FF:FF:FF | X |
| 4 | 22:22:FF:00:00:01 | C |

Flow of forwarding

PHYS-IF : Physical Interface
PDCF : Processor for Directives to Change Filtering
FLTR : Filtering

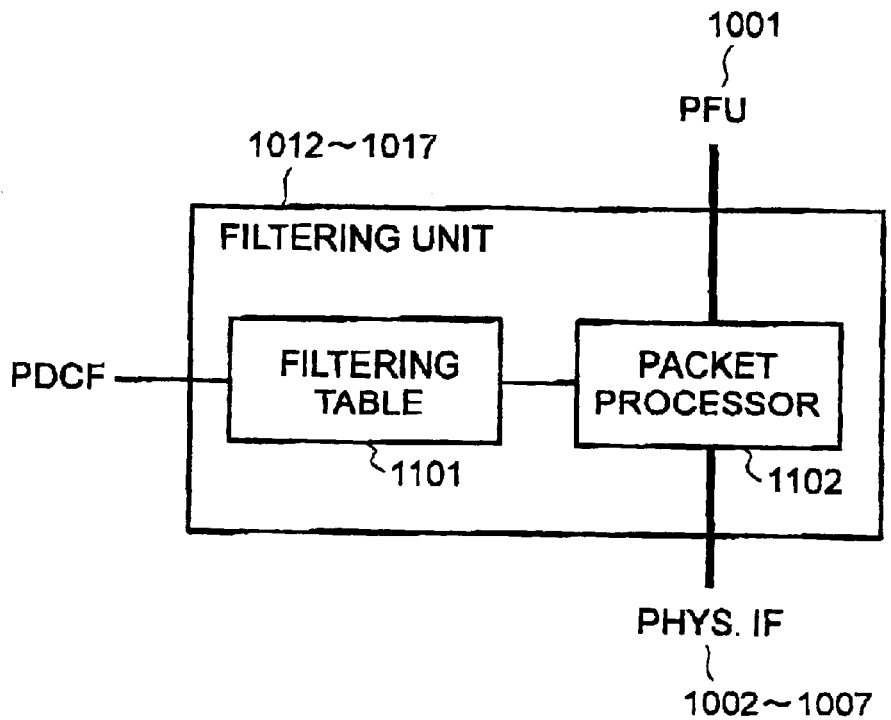

SV-AUTH : Server for Authentication

FIG.15

| # | Dest. Addr. Condition | Source Addr. Condition | Forward/Discard Flag |
|---|---|---|---|
| 1 | Arbitrary | 192.168.3.3 | Forward |
| 2 | 192.168.1.1 | Arbitrary | Forward |
| 3 | Arbitrary | Arbitrary | Discard |

NIF : Network Interface
PDPCS : Processor for Directives
Packets to Change State
FLTR : Filtering
LA : Learned Address

FIG. 17

| # (1607) | MAC Address (1701) | IP Address (1702) | Connection Port (1703) |
|---|---|---|---|
| 1 | 22:22:FF:00:00:01 | Unregistered | B |

FIG. 18

| # (1606) | MAC Address (1801) | Connection Port (1802) |
|---|---|---|
| 1 | 22:22:00:44:44:44 | A |

ENCP : Encapsulation
SV-AUTH : Server for Authentication

ENCP : Encapsulation
SV-AUTH : Server for Authentication

FIG.29

SUBNET TABLE

| # | Subnet Addr. | Subnet Mask | IP Addr. of FLTR ST MGR | IP Addr. of Packet comm. apparatus |
|---|---|---|---|---|
| 1 | 147.3.1.0 | 255.255.255.0 | 137.2.2.100 | 147.3.1.220 |
| 2 | 147.3.2.0 | 255.255.255.0 | 137.2.2.100 | 147.3.1.220 |
| 3 | 147.3.3.0 | 255.255.255.0 | 137.2.2.100 | 147.3.1.220 |
| 4 | 147.4.1.0 | 255.255.255.0 | 137.2.2.100 | 147.4.1.220 |
| 5 | 147.4.2.0 | 255.255.255.0 | 137.2.2.100 | 147.4.1.220 |
| 6 | 147.5.1.0 | 255.255.255.0 | 137.2.2.100 | 147.5.1.220 |
| 7 | 147.5.2.0 | 255.255.255.0 | 137.2.2.100 | 147.5.1.220 |
| 8 | 147.5.3.0 | 255.255.255.0 | 137.2.2.100 | 147.5.1.220 |

FIG.30

TABLE. ADDRESS FOR AUTH

| # | Server Addr. |
|---|---|
| 1 | 137. 1. 1. 1 |
| 2 | 137. 1. 1. 2 |
| 3 | 137. 1. 1. 3 |

FIG.31

TABLE. OUT-OF-AUTH ADDRESS (PACKET COMM. APPARATUS A)

| # | Out-of-AUTH Addr. |
|---|---|
| 1 | 22:22:00:00:00:03 |

AUTH : Authentication
FLTR ST MGR : Filtering Status Manager

LA : Learned Address
OAA : Out-of-Authentication Address
FLTR : Filtering
ADAUTH : Address for Authentication UAU : User Authentication Unit
ASD : Authentication States Detector
FLTR ST MGR : Filtering Status Manager LA : Learned Address
OAA : Out-of-Authentication Address

FIG.35

2811      LEARNED ADDR. TABLE

| # | MAC Addr. | IP Addr. | Status | Valid Period |
|---|---|---|---|---|
| 1 | 22:22:00:11:11:11 | 0.0.0.0 | Filtering ON | 3600 sec. |

FIG.36

281      LEARNED ADDR. TABLE

| # | MAC Addr. | IP Addr. | Status | Valid Period |
|---|---|---|---|---|
| 1 | 22:22:00:11:11:11 | 147.3.3.1 | Filtering ON | 3600 sec. |

FIG.37

281      LEARNED ADDR. TABLE

| # | MAC Addr. | IP Addr. | Status | Valid Period |
|---|---|---|---|---|
| 1 | 22:22:00:11:11:11 | 147.3.3.1 | Filtering OFF | 300 sec. |

LA : Learned Address

US 6,907,470 B2

COMMUNICATION APPARATUS FOR ROUTING OR DISCARDING A PACKET SENT FROM A USER TERMINAL

BACKGROUND OF THE INVENTION

The present invention relates to packet communications apparatus and a network system, and more particularly, to packet communications apparatus and a network system arranged for preventing the unfair use of networking service, wherein a LAN switch, router, etc is used as that apparatus.

Recently, it has been appreciated that information security techniques for restricting network use are required in order to ensure the confidentiality of information transferred over networks. On the other hand, with convenient use of networks taken into consideration, networking is implemented such that, only by connecting a terminal to a network, the terminal user can use networking service in some Local Area Networks (LANs), typically, for example, a 802.3 network of Carrier Sense Multiple Access with Collision Detection (CSMA/CD) type, the specifications thereof being prescribed by the Institute of Electrical and Electronics Engineers, Inc. (IEEE).

For a network using a Dynamic Host Configuration Protocol (DHCP) standardized by the Internet Engineering Task Force (IETF), when a terminal is newly connected to the network, its address is automatically assigned to it. By combining these networks or LANs with mobile terminals such as notebook-size personal computers, a (public) network parts system has appeared, allowing a terminal user to use networking service from anywhere, whenever necessary. Technique regarding the network ports system has been disclosed in, for example, JP-A-68765/1999.

SUMMARY OF THE INVENTION

As networks become easy to use, however, it is conceivable that even a user who is not authorized to use networking service (unauthorized user) can use networking service only if the user's terminal is connected to a network. Consequently, a security problem arises that resources such as file servers connected to the network system are unfairly accessed from unauthorized users.

As technique used for preventing such unfair access by Unauthorized users, "packet filtering" carried out by packet communications apparatus such as routers is known. To enable packet filtering, the conditions for packet filtering must be preset. However, it is almost impossible to predetermine the conditions for packet filtering for the above-mentioned network ports system or the like, that is, networks wherein a terminal at any place is assigned a dynamically leased address for networking.

Addressing the above-described problem, an object of the prevent invention is to provide packet communications apparatus and a network system that prevent unauthorized users from using networking service unfairly.

Another object of the present invention is to provide packet communications apparatus and a network system wherein, even if a user connects the user terminal to a network from anywhere and using a different address each time the terminal is reconnected to the network, the user can gain access to a network resource entity only if authorized to access the entity.

In accordance with the present invention, a packet communications apparatus is provided that is used in a network system wherein user terminals that can be linked via a network to the apparatus send/receive packets to/from a server for authentication and a file server connected via a network to the apparatus, comprising a plurality of network interfaces, a learned address table containing information for identifying a network interface through which to send a packet, a packet forwarding unit that selects a port through which to forward a packet by referring to the learned address table, according to the state of the network interfaces, and forwards or discards a packet sent from the user terminal, addressed to the server for authentication/file server and vice versa, a processor for directive packets to change state that receives a directive packet to change state, holding a directive to change the state of a specific network interface to one of the connected state, disconnected state and stateless, via the packet forwarding unit from the server for authentication, and state managers, each installed in each network interface and each that receives a directive packet to change state from the processor for directive packets to change state and changes the state of the network interface to one of the connected state, disconnected state and stateless, according to the directive packet to change state.

Moreover, in accordance with the present invention, a packet communications apparatus is provided that is used in a network system wherein user terminals that can be linked via a network to the apparatus send/receive packets to/from a server for authentication and a file server connected via a network to the apparatus, comprising physical interfaces, each making the connection to a network, a packet forwarding unit that selects a port through which to forward a packet, filtering units that perform packet filtering, each located between each physical interface and the packet forwarding unit and comprising a filtering table containing information for forwarding or discarding a packet and a packet processor that discards a packet or transfers a packet to the packet forwarding unit, according to the contents of the filtering table, and a processor for directives to change filtering that transfers a directive to change filtering from the server for authentication to the appropriate filtering unit, changes the information in the filtering table initially set to discard all received packets, according to the directive from the server for authentication, and sequentially adds information for forwarding such packets to the file server that include the address of a user terminal that has now been user-authenticated by the server for authentication as the source address to the filtering table.

Moreover, in accordance with the present invention, a packet communications apparatus is provided that is used in a network system wherein user terminals that can be linked via a network to the apparatus send/receive packets to/from a server for authentication and a file server connected via a network to the apparatus, comprising network interfaces for sending/receiving packets to/from the user terminals, the server for authentication and the file server, an IP address registration table in which the addresses of the user terminals user-authenticated by the server for authentication are registered, and a packet forwarding unit that forwards a packet whose source address matches an address registered in the IP address registration table and encapsulates a packet whose source address is not registered in the IP address registration table and then sends the encapsulated packet to a specific address.

A feature of the present invention is that the packet communications apparatus essentially comprises a plurality of network interfaces, the packet forwarding unit, and the state managers, each keeping the state of each network interface in one of the connected state, disconnected state and stateless. The packet forwarding unit selects a port through which to forward a packet, depending on the state of the network interfaces.

Another feature of the present invention is that the packet communications apparatus includes the processor for directive packets to change state and can change the state of a network interface that is specified in a directive packet to change state to a state specified in the directive packet.

A further feature of the present invention is that each network interface includes a link down detector and the packet communications apparatus can change the state of the network interface to disconnected state when the link down detect detects link-down.

The present invention is preferably implemented such that all network interfaces are initialized to disconnected state when the packet communications apparatus initialized.

Yet another feature of the present invention is that the packet communications apparatus can forward packets received at a network interface set in the disconnected state to only a specific network interface.

The present invention is preferably implemented such that the packet communications apparatus does not forward packets received at a network interface set in the disconnected state to a network interface set in the disconnected or connected state.

The present invention is preferably implemented such that the packet communications apparatus changes the state of a network interface to which a terminal operated by an authenticated user is linked to the connected state.

A still further feature of the present invention is that the packet communications apparatus essentially comprises a plurality of network interfaces, the packet forwarding unit, the filtering table, the packet filtering units that perform packet filtering, according to the contents of the filtering table, and the processor for directives to change filtering that updates the contents of the filtering table by a directive from the external, and to the filtering tables whose contents are initially set to discard all received packets, information for permitting the packet communications apparatus to forward packets including a specific source address can be added sequentially, according to a directive from the external.

The present invention is preferably implemented such that information for permitting the packet communications apparatus to forward packets whose destination address is the address of a terminal operated by an authenticated user is sequentially added to the filtering table.

A yet another feature of the present invention is that the packet communications apparatus essentially comprises a plurality of network interfaces, the packet forwarding unit, the filtering table, the learned address table, and the processor for directive packets to change state, and when it receives a directive packet change state that directs it to register the source address of the received packet into the filtering table and register a specific address registered in the filtering table into the learned address table, the processor for directive packets to change state registers the specific address registered in the filtering table into the learned address table.

The present invention is preferably implemented such that the packet communications apparatus unconditionally forwards a packet whose destination address is registered in the learned address table and forwards a packet whose destination address is registered in the filtering table, but not registered in the learned address table, provided the packet includes a specific source address.

The present invention is preferably implemented such that the packet communications apparatus can be directed to register the address of a terminal operated by an authenticated user into the learned address table.

The present invention is preferably implemented such that the packet communications apparatus essentially comprises a plurality of network interfaces, the packet forwarding unit, and the address registration table, forwards a packet whose source address is registered in the address registration table, and encapsulates a packet whose source address is not registered in the address registration table and then sends the encapsulated packet to a specific address.

The present invention is preferably implemented such that, when encapsulating and sending a packet whose source address is not registered in the address registration table, as the destination address of the encapsulated packet, the address of the equipment that performs user authentication is specified in the packet.

The present invention is preferable implemented such that the packet communications apparatus registers the address of a terminal operated by an authenticated user into the address registration table.

The present invention is preferably implemented such that each network interface of the packet communications interface has a function of monitoring its state, thereby seeing whether it is in the disconnected state, and disconnects communication if it enters the disconnected state.

The present invention is preferably implemented such that, when a terminal is disconnected from the network, the network interface that detected the disconnection automatically changes to "disconnected" state.

The present invention is preferably implemented such that the packet communications apparatus memorizes the addresses respectively assigned to terminal users and sets packet filtering On/Off, according to the memorized addresses.

Other and further objects, features and advantages of the invention will appear more fully from the following description.

BRIEF DESCRIPTION OF THE DRAWINGS

A preferred form of the present invention illustrated in the accompanying drawings in which:

FIG. 2 is a structural diagram of one of network interfaces 102 to 107;

FIG. 3 illustrates a learned address table 108 and entries;

FIG. 11 is a structural diagram of one of filtering units 1012 to 1017;

FIG. 12 illustrates a filtering table 1101 and entries;

FIG. 15 illustrates the filtering table 1101 and updated entries;

FIG. 17 illustrates a filtering table 1606 and entries;

FIG. 18 illustrates a learned address table 1606 and entries;

FIG. 29 illustrates a subnet table 2814 and entries;

FIG. 30 illustrates an address for authentication table 2813 and entries;

FIG. 31 is an out-of-authentication address table 2812 and entry;

FIG. 35 illustrates a learned address table 2811 and entries;

FIG. 36 illustrates the learned address table 2811 and updated entries;

FIG. 37 illustrates the learned address table and updated entries; and

DESCRIPTION OF THE PREFERRED EMBODIMENTS

With reference to the appended drawings, preferred embodiments of the present invention will be described below.

Figure 1:
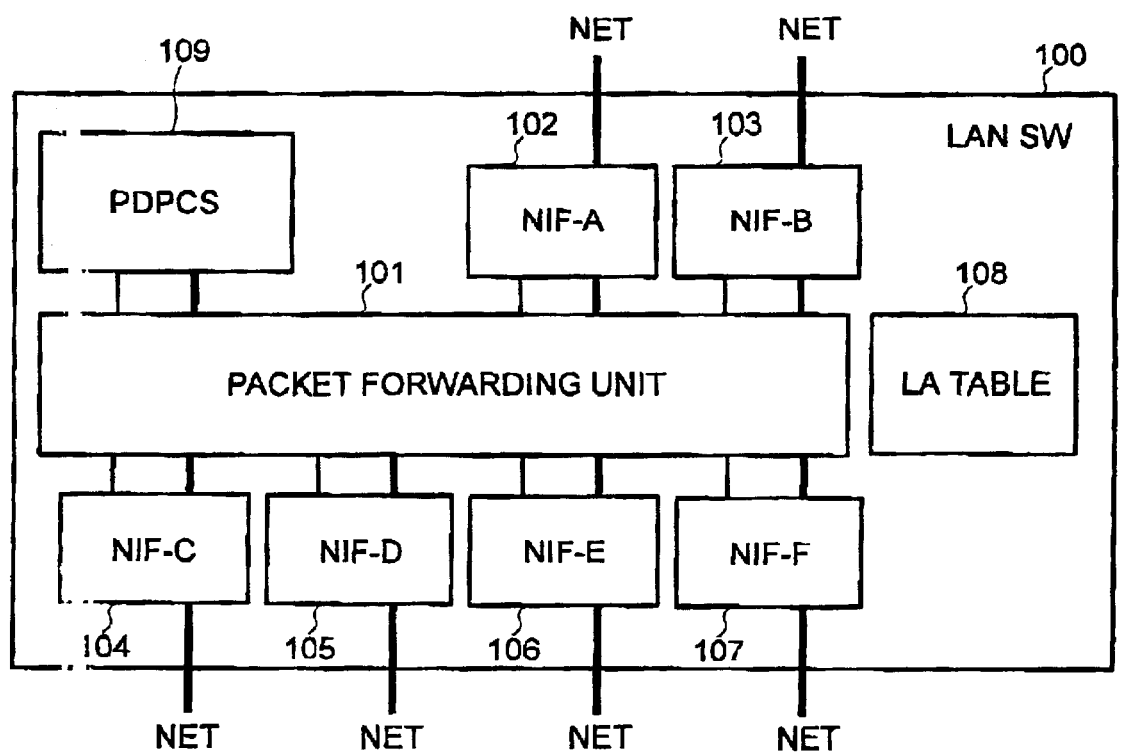
FIG. 1 is a structural diagram of a packet communications apparatus in accordance with a preferred embodiment of the present invention.

FIG. 1 is a structural diagram of a packet communications apparatus configured in accordance with a preferred embodiment (first illustrative embodiment) of the present invention.

A LAN switch 100 as the packet communications apparatus, for example, comprises a packet forwarding unit 101, a plurality of network interfaces (hereinafter abbreviated to NIFs) 102 to 107, a learned address table 108, and a processor for directive packets to change state (hereinafter abbreviated to PDPCS) 109. The NIFs 102 to 107 are assigned respective names (A to F as shown) for their unique identification. Instead of the names, numbers or the like may be used if the NIFs can uniquely be identified by them.

These NIFs 102 to 107 are respectively connected to different networks and perform packet sending/receiving. In the first illustrative embodiment, it is assumed that 802.3 networks of CSMA/CD type, the specifications thereof being prescribed by the IEEE, are connected to the switch with twisted pair cables. However, the present invention is applicable to other types of networks (for example, wireless networks).

The packet forwarding unit 101 connects with all NIFs 102 to 107 and performs packet forwarding on a data link layer in an Open System Interconnection (OSI) reference model. The learned address table 108 contains information required for the packet forwarding unit 101 to determine an NIF through which to send a packet.

FIG. 3 illustrates a learned address table 108 and entries (1).

The learned address table 108 contains entries in an address field 301 and a sending port field 302. The address field 301 contains a physical address (hereinafter represented as a MAC address) and the sending port field 302 contains the name of an NIF. The meaning of each line of entry in the learned address table 108 is that, if the destination address of a packet matches the address in the address field 301, the packet is sent through the NIF in the sending port field 302 on the same entry line. Additionally, a plurality of NIFs may be registered into the sending port field 302. As an example, for a special case, if the MAC address of the LAN Switch 100 itself has been registered into the address field 301 and "X" into the sending port field 302, the meaning of this entry line is that the packet is handled as the packet addressed to the LAN switch 100.

The PDPCS 109 receives via the packet forwarding unit 101 a directive packet to change state sent across any network connected to the LAN switch 100 from an external entity (e.g., a server for authentication 401 which will be described later) to the LAN switch 100. The PDPCS 109 notifies the appropriate one of the NIFs 102 to 107 of the contents of the received directive packet to change state. The directive packet to change state holds a directive to change the state of a specific NIF to a specific state as information. As the protocol for packet communications discussed herein, for example, a Simple Network Management Protocol (SNMP) is used. However, other protocols such as a telecommunications network protocol (telnet) and a Hyper Text Transfer Protocol (HTTP) may be used. While the LAN switch 100 is used as the packet communications apparatus in the first illustrative embodiment, the present invention is applicable to a router and other types of packet communications apparatus.

FIG. 2 is a structural diagram of one of the NIFs 102 to 107.

An NIF, any one of 102 to 107, for example, comprises a physical interface 201 to which a network link is terminated, a link down detector 202 that finds whether the network is now workable, and a state manager 203 that controls the state of the NIF, wherein the physical interface 201 and the state manager 203 are connected to the packet forwarding unit 101.

The link down detector 202 electrically finds whether the circuit (cable) of the network is connected to the LAN switch or whether a terminal connected to the LAN switch over the line is set in the communication enabled state (powered-on state). The link down detector 202 notifies the state manager 203 of detected link-down. In the first illustrative embodiment, the link down detector 202 detects link-down in this way: after the physical interface 201 alerts it to watch the link-down state, if that state continues for 100 ms or longer, it judges that the link is down. If an optical fiber is used as the circuit, link-down detection is performed, depending on whether optical signals come. If a wireless channel is used instead, that detection is performed, depending on whether radio waves come.

The state manager 203 controls the state of the NIF that may be "connected" state, "disconnected" state, or "stateless." The user (the administrator of the switch) can preset the NIF, any one of 102 to 107, in the "connected" state or "stateless" invariably by instructing the state manager 203 to do so. The NIF, any one of 102 to 107, is fixed in either state if set by the user; otherwise, it is initially put in the "disconnected" state. When the link down detector 202 notifies the state manager 203 of link-down, the state manager changes the NIF state to the "disconnected" state unless a specific state is preset by the user. Moreover, when the PDPCS 109 gives the state manager some instruction, the state manager changes the NIF state to one of the above three states, according to the instruction.

Then, using a network system as will be shown in FIG. 4 as an example, the operation of the network system in which the packet communications apparatus of the present invention is used will be described below.

Figure 4:
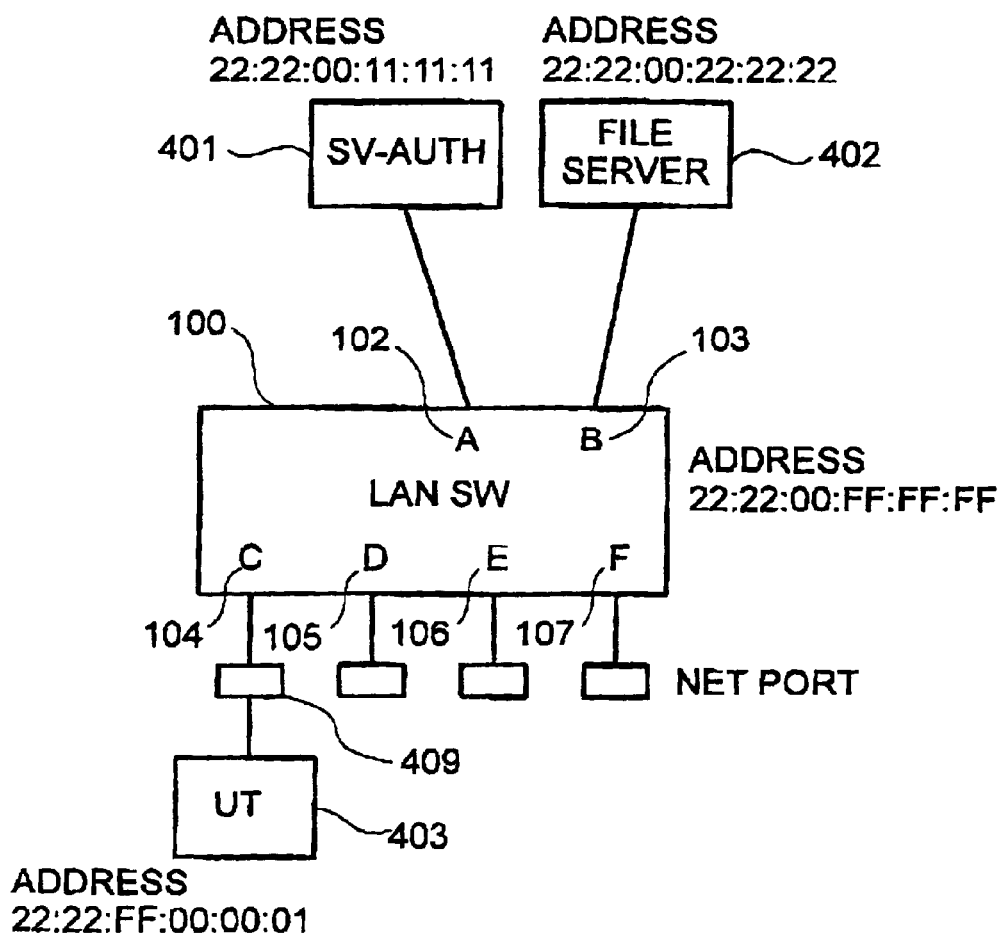
FIG. 4 is a topological schematic diagram of a network system in which a LAN switch 100 is used.

FIG. 4 is a topological schematic diagram of the network system in which the LAN switch 100 of the first illustrative embodiment is used.

The present network system, for example, comprises the LAN switch 100 (with its MAC address being 22:22:00:FF:FF:FF); a server for authentication 401 (with its MAC address being 22:22:00:11:11:11) connected to the NIF-A 102 of the LAN switch 100; a file server 402 (with its MAC address being 22:22:00:22:22:22) connected to the NIF-B 103 of the LAN switch 100; so-called network ports 409 respectively linked to the NIFs C to F, 104 to 107, allowing end users to use networking service by freely connecting their terminal thereto; and a representative user terminal 403 (with its MAC address being 22:22:FF00:00:01) connected via a network port 409 to the NIF-C 104.

The server for authentication 401 judges whether a terminal user that is attempting connection is authorized to use networking service and notifies the LAN switch 100 of the result thereof. In the first illustrative embodiment, a terminal user is authenticated by user ID and password. The initial settings of the NIFs A to F (102 to 107) of the LAN switch 100 are assumed as follows: NIF-B 103 is set in the invariably "connected" state, NIF-A 102 is set in the "stateless" and the remaining NIFs C to F (104 to 107) are not set in any state. Thus, the NIFs C to F (104 to 107) remains in the "disconnected" state when being initialized (at this time, the contents of the learned address table 108 in the LAN switch 100 are as shown in FIG. 3).

Then, in the present network system, assume that the user terminal 403 (with its MAC address being 22:22:FF:00:00:01) has now been connected to the network port 409 that is connected to the NIF-C. This case will be discussed below.

Figure 5:
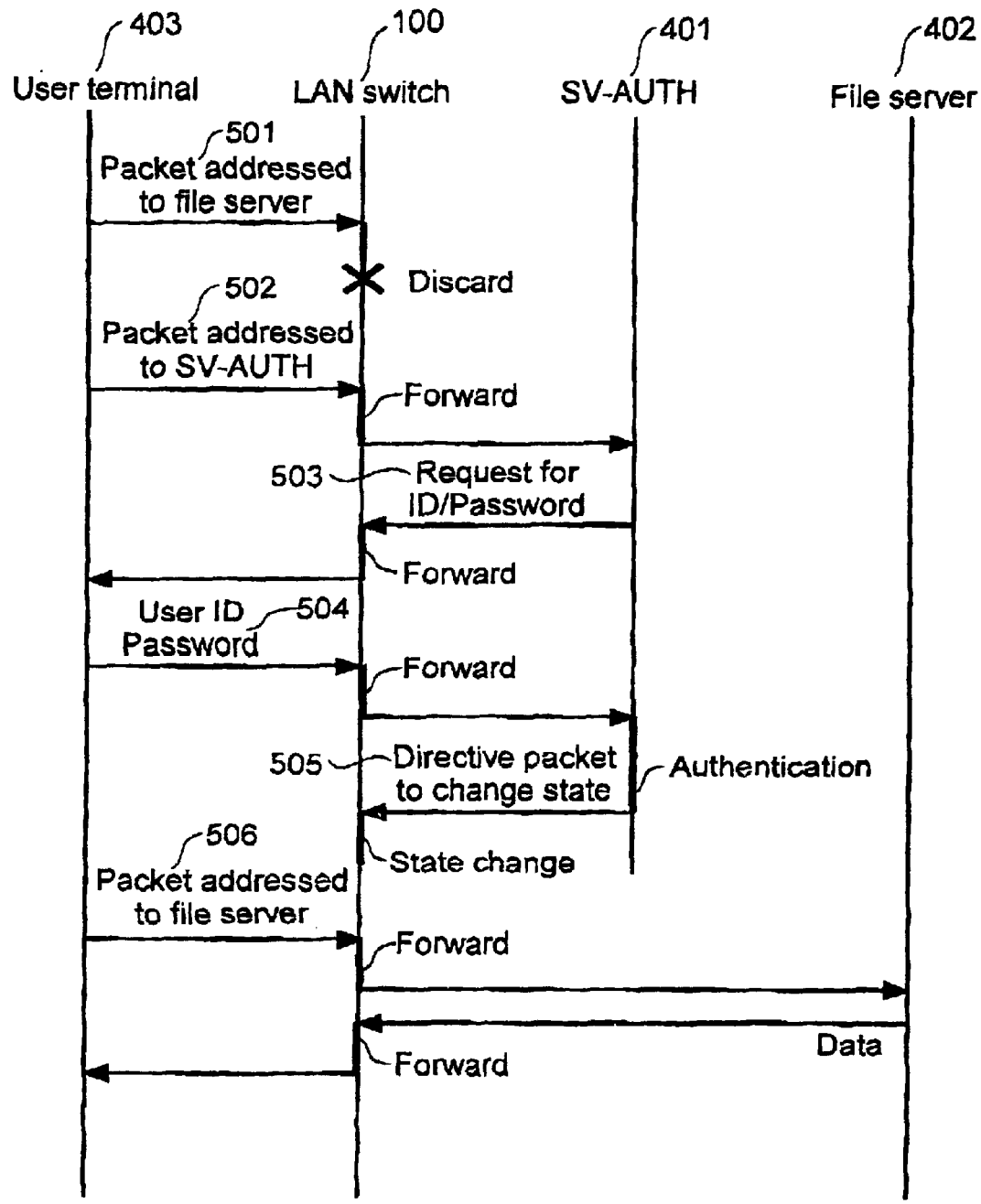
FIG. 5 is a diagram of communication sequence after the connection of a user terminal 403 to a network port 409.

FIG. 5 is a diagram of communication sequence after the user makes the connection of the user terminal 403 to the network port 409.

If the user terminal 403 is not yet user-authenticated, but access to the file server 402 is attempted therefrom, a packet 501 addressed to the file server is sent from the user terminal 403 with its destination address being the MAC address (22:22:00:22:22:22) of the file server and its source address being the MAC address (22:22:FF:00:00:01) of the user terminal 403. When the LAN switch 100 receives the packet 501, a process of forwarding the packet begins, which will be explained below.

Figure 6:
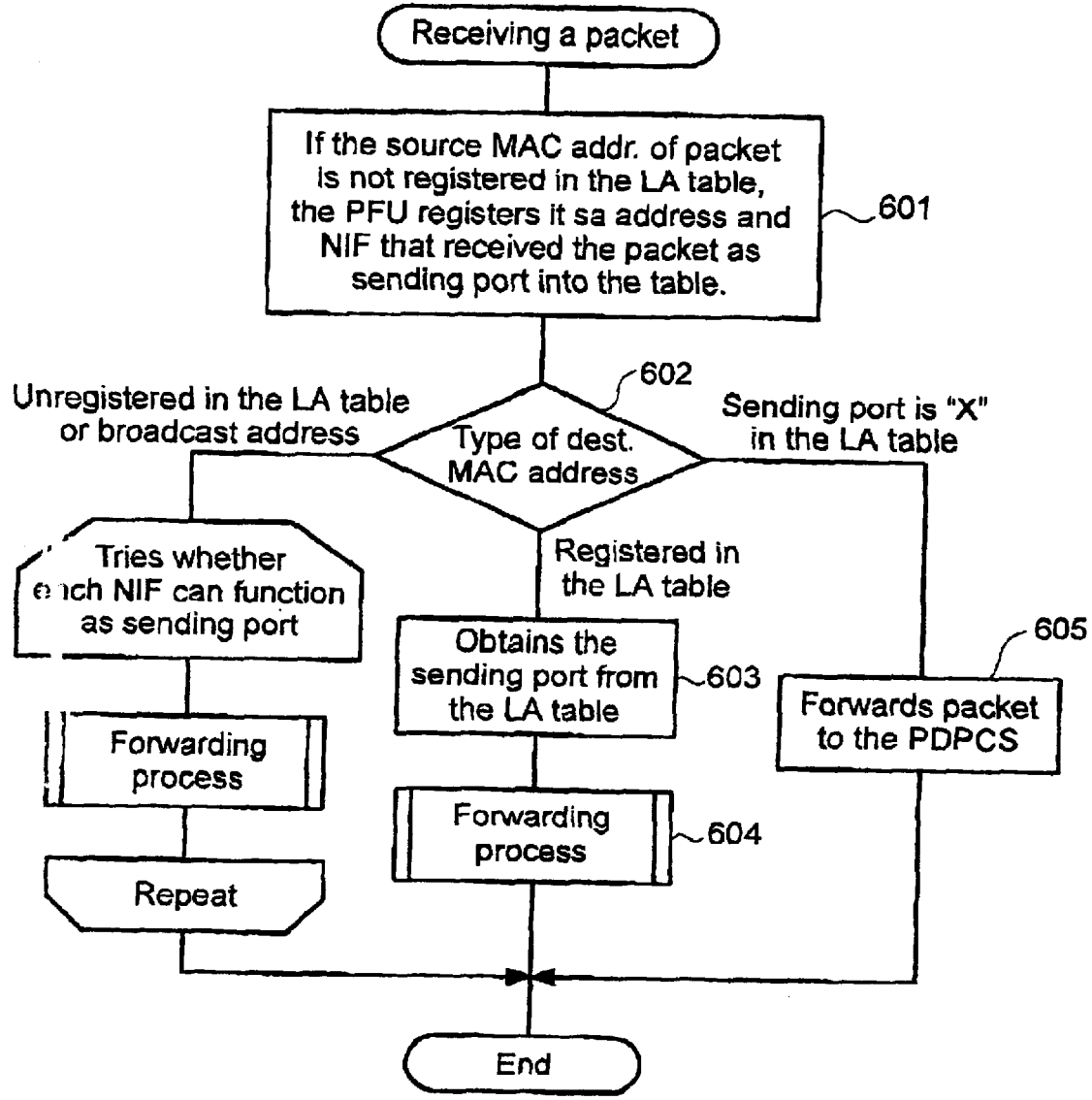
FIG. 6 is a flowchart illustrating how the LAN switch 100 forwards a packet.

FIG. 6 is a flowchart illustrating how the LAN switch 100 forwards a packet it received.

The packet forwarding unit 101 of the LAN switch 100, which received the packet 501, refers to the learned address table 108. If the source address (the MAC address 22:22:FF:00:00:01 of the user terminal 403) is not registered in the learned address table 108, the packet forwarding unit 101 registers it into the address field 301 or an additional entry line in the learned address table 108. At the same time, the packet forwarding unit 101 registers C, the name of the NIF that received the packet 501 into the sending port filed 302.

Figures 7, 8:
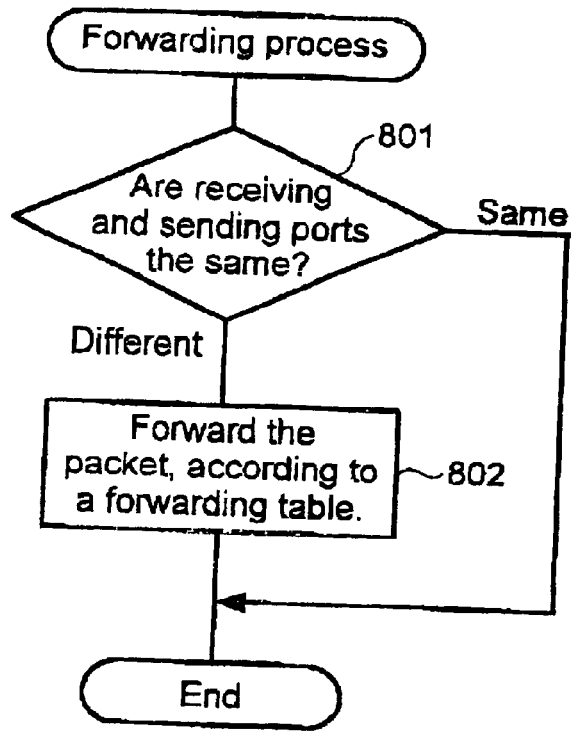
FIG. 7 illustrates the leaned address table 108 and updated entries.
FIG. 8 is a flowchart of the step 604 mentioned in FIG. 6.

FIG. 7 illustrates the learned address table 108 and entries (2).

In the learned address table 108, the MAC address of the user terminal 403 as the source address has now been registered in the address field on the entry #4 line and NIF-C in the sending port field as well.

Since the destination address, the MAC address (22:22:00:22:22:22) of the file server 402 has been registered in the learned address table 108 (step 602), then, the packet forwarding unit 101 obtains NIF-B information as the port through which to send the packet 501, from the content of the sending port field 302 on the entry line on which the destination address of the file server 402 has been registered in the learned address table 108 (step 603). Then, the packet forwarding unit 101 carries out the forwarding process (step 604).

The step 604 will now be explained.

FIG. 8 is a flowchart of the step 604.

First, the packet forwarding unit 101 judges whether the sending port (NIF-B 103 in this case) and the receiving port (NIF-C 104 in this case) are the same (step 801). Since the sending port and the receiving port are different in the case in question, the packet forwarding unit 101 forwards the packet, according to a forwarding table 901 which will be described below (step 802).

Figure 9:
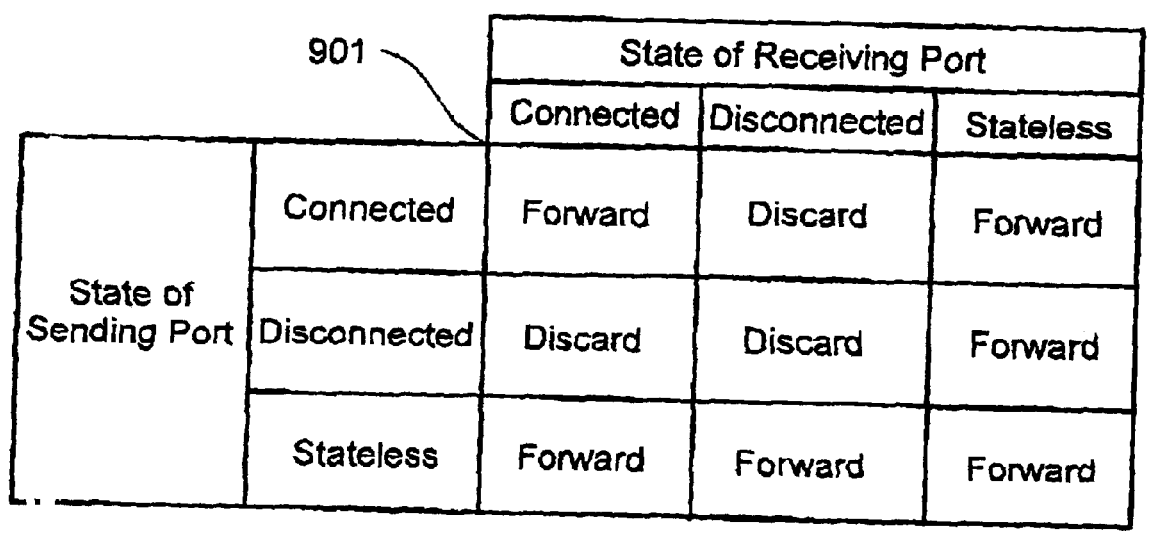
FIG. 9 illustrates a forwarding table 901 and entries.

FIG. 9 illustrates the forwarding table 901 and entries.

The forwarding table 901 is used for the packet forwarding unit to determine whether to forward or discard a packet, depending on the receiving port state and the sending port state. According to the table entries in the case in question, the receiving port (NIF-C 104) of the LAN switch 100 at which the packet 501 sent from the user terminal 403 was received remains in the "disconnected" state, while the sending port (NIF-B 103) is set in the "connected" state Thus, the forwarding table 901 indicates "discard." In consequence, the packet 501 is discarded by the packet forwarding unit 101. By this action, the access from the unauthenticated user terminal 403 to the file server 402 has now been avoided.

Then, a case where the user terminal 403 sends the server for authentication 401 a packet 502 addressed to the server for authentication will be discussed.

The user terminal 403 sends the packet 502 with its destination address being the MAC address (22:22:00:11:11:11) of the server for authentication 401 and its source address being the MAC address (22:22:FF:00:00:01) of the user terminal 403. When the LAN switch 100 receives that packet 502, its packet forwarding unit 101 begins the process of forwarding the packet, according to the above flowchart shown in FIG. 6.

The packet forwarding unit 101 skips the first step 603 because the MAC address (22:22:FF:00:00:01) of the user terminal 403 has already been registered into the learned address table 106 on the last time reception of the preceding packet 501. Since the destination address, the MAC address (22:22:00:11:11:11) of the server for authentication 401 has been registered in the learned address table 108 (step 603), then, the packet forwarding unit 101 obtains NIF-A information as the port through which to send the packet 502, from the content of the sending port field 302 on the entry line on which the destination address of the server for authentication 401 has been registered in the learned address table 108 (step 603). Then, the packet forwarding unit 101 carries out the forwarding process (step 604).

The step 604 will now be explained again, referring to FIGS. 8 and 9.

In the first step in FIG. 8, since the sending port (NIF-A 102 in this case) and the receiving port (NIF-C 104 in this case) are different (step 801), the process goes to the step 802. In the forwarding table 901 shown in FIG. 9, since the state of the NIF-C 102 that is the receiving port is "disconnected" and the state of the NIF-A that is the standing port is "stateless," the forwarding table 901 indicates "forward." In consequence, the packet forwarding unit 101 forwards the packet 502 to the server for authentication 401 through the NIF-A 102.

Moreover, a reply packet 503 is similarly forwarded from the server for authentication 401 to the user terminal 403. In this case, the NIF-A 102 is the port to receive the packet 503 and the NIF-C 104 is the port to send it. The forwarding table 901 indicates "forward" as the state of the NIF-C is "disconnected" and the state of the NIF-A is "stateless." Consequently, the packet forwarding unit 101 forwards the packet 503 to the user terminal 403 through the NIF-C 104. Thereby, a bidirectional communication path between the server for authentication 401 and the user terminal 403 has now been established and a user authentication procedure begins.

On the server for authentication 401, if, for example, user ID and password 504 included in the packet 502 sent from the user terminal 403 matches those that it holds as those of the user authorized to use networking service, the server sends notice of connection permission to the LAN switch 100. For the notice of connection permission, a directive packet to change state 505 with its destination address being the MAC address (22:22.00:FF:FF:FF) of the LAN switch 100 is used. The packet 505 includes the directive to "change to connected state" and the MAC address (22:22:FF:00:00:01) of the user terminal 403 as information.

When the LAN switch 100 receives the directive packet to change state 505, its packet forwarding unit 101 refers to the learned address table 108. Return to FIG. 6. In the learned table 108, "X" is designated in the sending port field 302 on the entry line on which the MAC address of the LAN switch 100 itself has been registered as the destination address of the directive packet to change state 505 (step 602). Thus, the packet forwarding unit 101 internally forwards the packet 505 to the PDPCS 109 (step 605). The PDPCS 109 obtains the MAC address (22:22:FF:00:00:01) of the user terminal 403 from the information included in the packet 505 and searches through the address fields 301 of the learned address table 108 for that MAC address. For the NIP (C in this case) designated in the sending port field 302 on the entry line on which the searched out MAC address of the user terminal 403 has been registered, the PDPCS 109 directs that its state be changed to "connected state."

In the NIF-C 104, the state manager 203 changes the NIF state from "disconnected" to "connected" state. After that, the NIF-C 104, that is, the port to receive a packet 506 addressed to the file server sent from the user terminal 403 is set in the "connected" state. In this case, because the NIF-B 103, that is, the port to send the packet is also held in the "connected" state, the forwarding table 901 indicates "forward." Thus, the user terminal 403 becomes possible to access the file server 402.

Then, assume that the user terminal 403 has now been disconnected from the network port 409. In this case, the LAN switch 100 operates as will be explained below.

When the user disconnects the user terminal 403 from the network port 409 by pulling out the cable (twisted pair) therefrom, the physical interface 201 of the NIF-C 104 enters the link down state. On the elapse of 100 ms with the NIF staying in that state, the link down detector 202 notifies the state manager 203 of link-down. The state manager 203, when being notified of link-down, changes the state of the NIF-C 104 to "disconnected" state. Thus, even if a new user terminal is connected to the same network port 409, access from the user terminal to the file server 402 will be disabled until it is user-authenticated.

As described above, by using the LAN switch 100 configured in accordance with the first illustrative embodiment, a network system can be built that refuses access from an unauthenticated user terminal 403 to the file server 402; only after the terminal user is authenticated, the terminal becomes possible to access the server. After disconnection of the user terminal 403 from the network port, the access to the file server 402 through the network port is refused before another user terminal connected to the port is user-authenticated. While the case where the user terminal 403 has been connected to the network port 409 connected to the NIF-C 104 was discussed above in the first illustrative embodiment, the NIFs C to F, 104 to 107, operate the same and produce the same effect no matter what network port 409 is used as the port to which the user terminal 403 is connected.

Furthermore, in the first preferred embodiment, the state of each NIF is reinitialized to "disconnected" state on the detection of link-down. Alternatively, a terminal user may notify the server for authentication 401 of a disconnection by communicating therewith before the user disconnects the link. Upon receiving that notification, the server for authentication 401 sends a packet including directive information to "change to disconnected state" and the MAC address of the user terminal 403 to the MAC address (22:22:00:FF:FF:FF) of the LAN switch 100. The PDPCS 109 receives this packet and the state of the NIF that forms the link changes to "disconnected" state as directed by the PDPCS. According to this manner, the user can perform On/Off control of using networking service without disconnecting the user terminal 403 from the network port 409.

Figure 10:
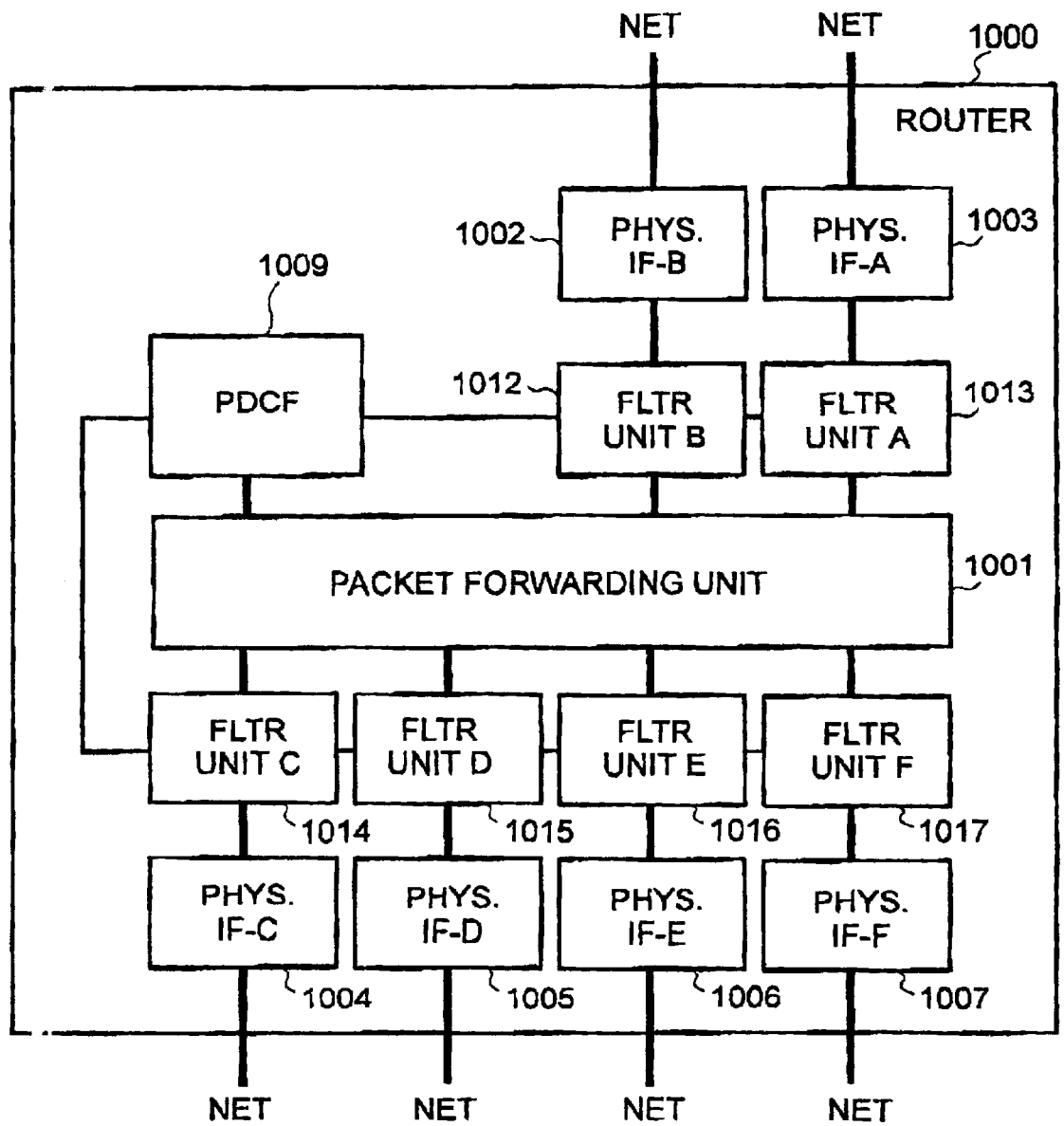
FIG. 10 is a structural diagram of a packet communications apparatus configured in accordance with another preferred embodiment of the invention.

FIG. 10 is a structural diagram of a packet communications apparatus configured in accordance with another preferred embodiment (second illustrative embodiment) of the present invention.

A router 1000 as the packet communications apparatus, for example, comprises a plurality of physical interfaces (hereinafter abbreviated to PHYS. IFs) 1002 to 1007, a packet forwarding unit 1001, a plurality of filtering units 1012 to 1017, and a processor for directives to change filtering (hereinafter abbreviated to PDCF) 1009. The PHYS. IFs 1002 to 1007 are respectively connected to different networks and perform packet sending/receiving. In the second illustrative embodiment, an IP protocol (IPv4 IP version 4)) is used as the protocol for forwarding packets. The present invention is, however, applicable to other network layer protocols such as, for example IPv6 (IP version 6). While the router 1000 is used as the packet communications apparatus in the second illustrative embodiment, the present invention is applicable to other types of packet communications apparatus such as a LAN switch.

FIG. 11 is a structural diagram of one of the filtering units 1012 to 1017.

A filtering unit, any of 1012 to 1017, comprises a filtering table 1101 and a packet processor 1102. The filtering table contains information used for judgment as to whether to forward or discard a packet. The packet processor 1102 discards a packet or transfers it to the packet forwarding unit 1001, according to the information contained in the filtering table 1101. The packet transferred to the packet forwarding unit 1001 is further transferred to one of the PHYS. IFs 1002 to 1007. Each filtering table 1101 is connected with the PDCF 1009 and the contents of the table 1101 can be changed as directed by the PDCF 1009.

FIG. 12 illustrates a filtering table 1101 and entries (1).

The filtering table 1101 contains information used for judgment as to whether to forward or discard a packet and entries in an destination address condition field 1201, a source address condition field 1202, and a forward/discard flag field 1203. In the destination address condition field 1201 and the source address condition field 1202, an IP address or data representing an "arbitrary" address is registered. In the forward/discard flag field 1203, information is registered to indicate whether to forward or discard a packet received whose destination address and source address match the destination address condition and the source address condition. If a packet meets a plurality of entries of address information, the top one out of the entries applies to the packet. For a packet not meeting any entry, the filtering unit transfers it to the packet forwarding unit 1001.

The PDCF 1009 communicates with a server for authentication 1311 via a network and receives a directive to change filtering from the server for authentication 1311. While telnet is assumed as the communication protocol in the second illustrative embodiment, other protocols such as HTTP and Common Open Policy service (COPS) may be used. The directive to change filtering includes information to be registered or deleted on a target entry line and a directive to add/delete it. The PDCF 1009 reflects the directive in the filtering table of the filtering unit, any of 1012 to 1017, corresponding to the PHYS. IF, any of 1002 to 1007, connected to the subnet to which the specified IP address contained in the source address condition field 1202 belongs.

Figure 13:
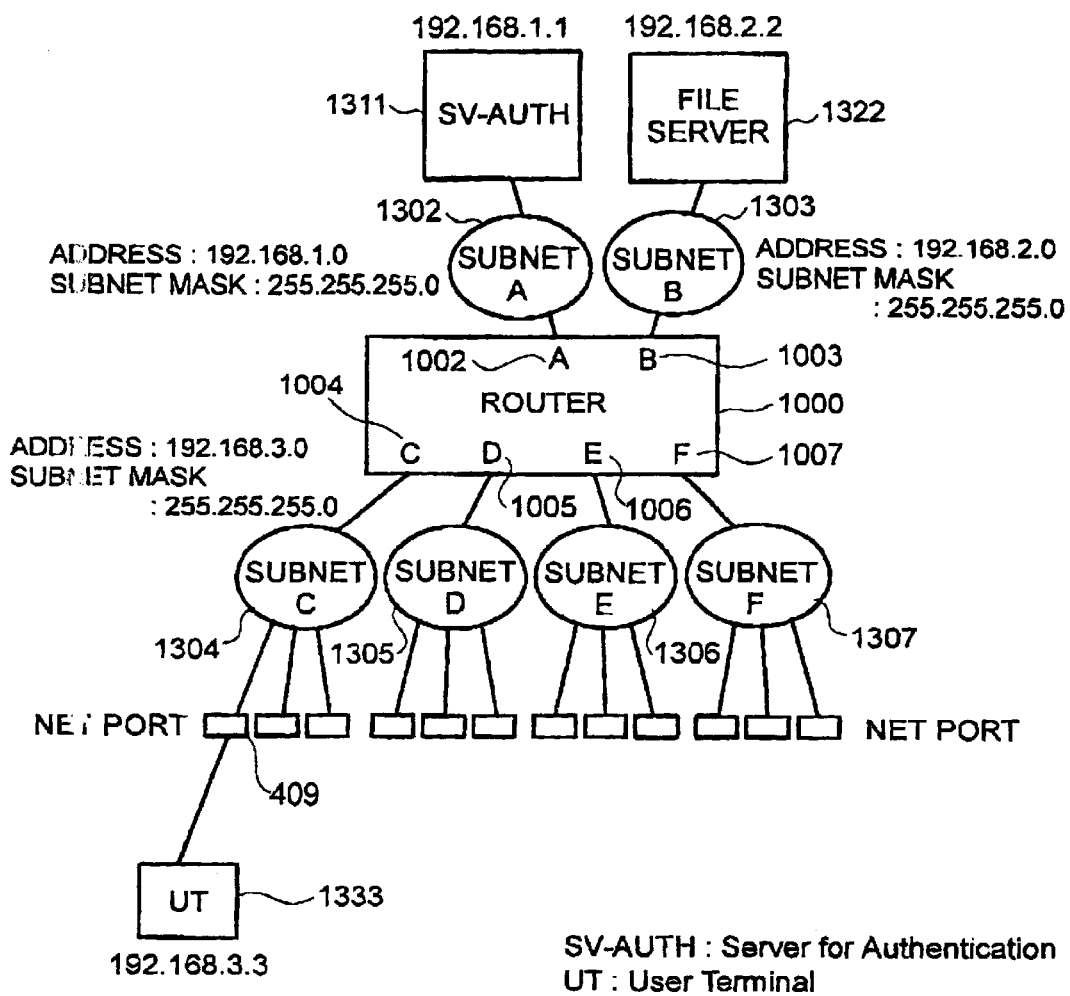
FIG. 13 is a topological schematic diagram of a network system in which a router 1000 is used.

FIG. 13 is a topological schematic diagram of a network system in which the router 1000 is used.

The present network system, for example, includes subnets A to F, 1302 to 1307, respectively connected to the PHYS. IFs 1002 to 11007 of the router 1000; a server for authentication 1311 connected to subnet A 1302; a file server 1322 connected to subnet b 1303; a plurality of network ports 409 respectively linked to subnets C to F, 1304 to 1307, allowing end users to freely connect their terminal thereto; and a representative user terminal 1333 connected via a network port 409 to subnet C 1304.

In the initial state, nothing is registered in the filtering tables 1101 of the filtering units A 1012 and B 1013 of the router 1000. In the filtering tables 1001 of the filtering units C to F, 1014 to 1017, the same contents are illustrated in FIG. 12 are set.

Then, in the present network system, assume that the user terminal 1333 has been connected to the network port 409 connected to the subnet C 1304. This case will be discussed below.

Figure 14:
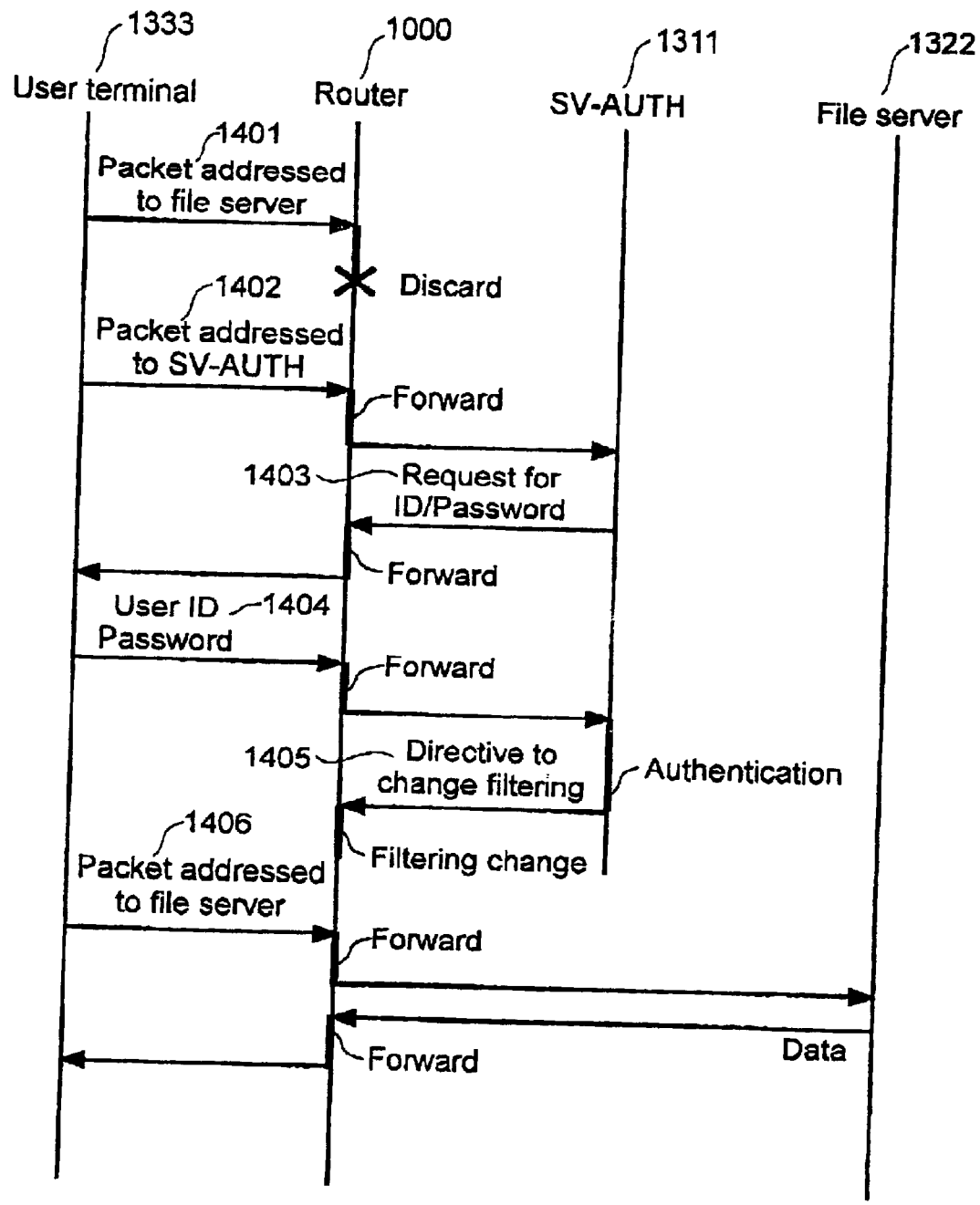
FIG. 14 is a diagram of communication sequence after the connection of a user terminal 1333 to a network port 409.

FIG. 14 is a diagram of communication sequence after the user makes the connection of the user terminal 1333 to the network port 409.

To access the file serer 1322, the user terminal 1333 that is not yet user-authenticated sends a packet 1401 addressed to the file server, that is, with its destination address being the IP address (192. 168.2.2) of the file server 1322. In this case, the packet 1401 is transferred via the PHYS. IF-C 1004 of the router 1000 to the filtering unit C 1014. In the filtering table 1101 of the filtering unit C 1014, as illustrated in FIG. 12, entry #2 exists, on the line of which the content of the destination address condition field 1201 matches the destination address included in the packet 1401. The filtering unit C 1014 refers to entry #2 in the filtering table 1101 and looks up the contents of the associated source address condition field 1202 and forward/discard flag field 1203. The content of the forward/discard flag field 1203 on the entry #2 line in the filtering table 1101 indicates "discard." Thus, the filtering unit C 1014 discards the packet 1401, according to the contents of the filtering table 1101. In consequence, the packet 1401 sent from the unauthenticated user terminal 1333 does not arrive at the file server 1322.

Next, a procedure in which the user terminal 1333 is user-authenticated and permitted for access to the file server 1322 will be explained.

To gain authentication, the user terminal 1333 sends a packet 1402 with its destination address being the If address (192.168.1.1) of the server for authentication 1311. The packet 1402 is received by the PHYS. IF-C 1004 or the router 100 and transferred to the filtering unit C 1014, The filtering unit C 1014 searches the filtering table 1101 for a match with the packet 1402. In this case, the contents of the address condition fields 1201 on both lines of entries #1 and #2 in the filtering table 1101 match the destination address included in the packet 1401.

Of these entries registered in the table, the top one, namely entry #1 applies to the packet 1402. The content of the forward/discard flag field 1203 on the line of entry #1 in the filtering table 1101 indicates "forward." Thus, the filtering unit C 1014 which referred to the filtering table 1101 and entry #1 transfers the packet to the packet forwarding unit 1001, according to the content of the forward/discard flag field 1203. The packet forwarding unit 1001 forwards the packet 1402 through the PHYS. IF-A 1002 to the server for authentication 1311. Thereby, a communication path from the user terminal 403 to the server for authentication 1311 has now been established.

A reply packet 1403 sent from the server for authentication 1311 to the user terminal 133 is received by the PHYS. IF-A 1002 and transferred to the filtering unit A 1012. The filtering table 1101 of the filtering unit A 1012 has no entries registered. Thus, the filtering unit A 1012 transfers the packet 1403 to the packet forwarding unit 1001.

The packet forwarding unit 1001 sends the packet 1403 through the PHYS. IF-C to the user terminal 1333. Thereby a bidirectional communication path between the user terminal 1333 and the server for authentication 1311 has now been established so that the user of the user terminal 1333 can gain authentication from the server for authentication 1311.

The packet 1403 requests the user terminal 1433 to send user ID and password. Thus, the user inputs user ID and password to the user terminal 1333 which received the packet 1403. A packet 1404 including the input user ID and password is sent from the user terminal 1333 to the server for authentication 1311. The packet 1404 is forwarded by the router 1000 as described above and received by the server for authentication 1311. On the server for authentication 1311, if the user ID and password included in the packet 1404 sent from the user terminal 1333 matches those that it holds as those of the user authorized to make networking connection, the server communicates with the PDCF 1009 of the router 1000 and issues a directive 1405 to add an entry line to the filtering table 1101 and register "arbitrary" into the destination address condition field 1201, "192.168.3.3," namely, the IP address of the user terminal 1333, into the source address condition field, and "forward" into the forward/discard flag field 1203.

FIG. 15 illustrates the filtering table 1101 and entries (2).

Since the subnet (subnet C 1304) to which the source address condition "192.168.3.3" specified by the directive from the server for authentication 1311 belongs is connected to the PHYS. IF-C 1004, the PDCF 1009 adds an entry line and registers those specified by the directive to the filtering table 1101 of the filtering unit C 1014. As a result, a new entry #1 line is added to the filtering table 1101 of the filtering unit C 1014 and the filtering table 1101 contains three sets of entries numbered #1 to #3 as illustrated in FIG. 15.

After that, when the user terminal 1333 sends a packet 1406 addressed to the file server 1322, the source address included in the packet 1406 matches the source address condition on the line of entry #1 in the filtering table 1101 of the filtering unit C 1014. Thus, the packet 1406 is transferred from the filtering unit C to the packet forwarding unit 111 and forwarded to the file server 1322. In consequence, the user terminal 1333 becomes possible to access the file server 1322.

As described above, by using the router 1000, a network system can be built that refuses access to the file server 1322 from a user terminal 1333 that is not yet user-authenticated by the server for authentication 1311; only after being user-authenticated, the user terminal 1333 is permitted to access the file server 1322. The PHYS. IFs 1002 to 1007 of the router 1000 each can accommodate a plurality of network ports 409. Moreover, the router has discrete filtering units per PHYS. IF so that the filtering load on the router 1000 can be distributed.

Figure 16:
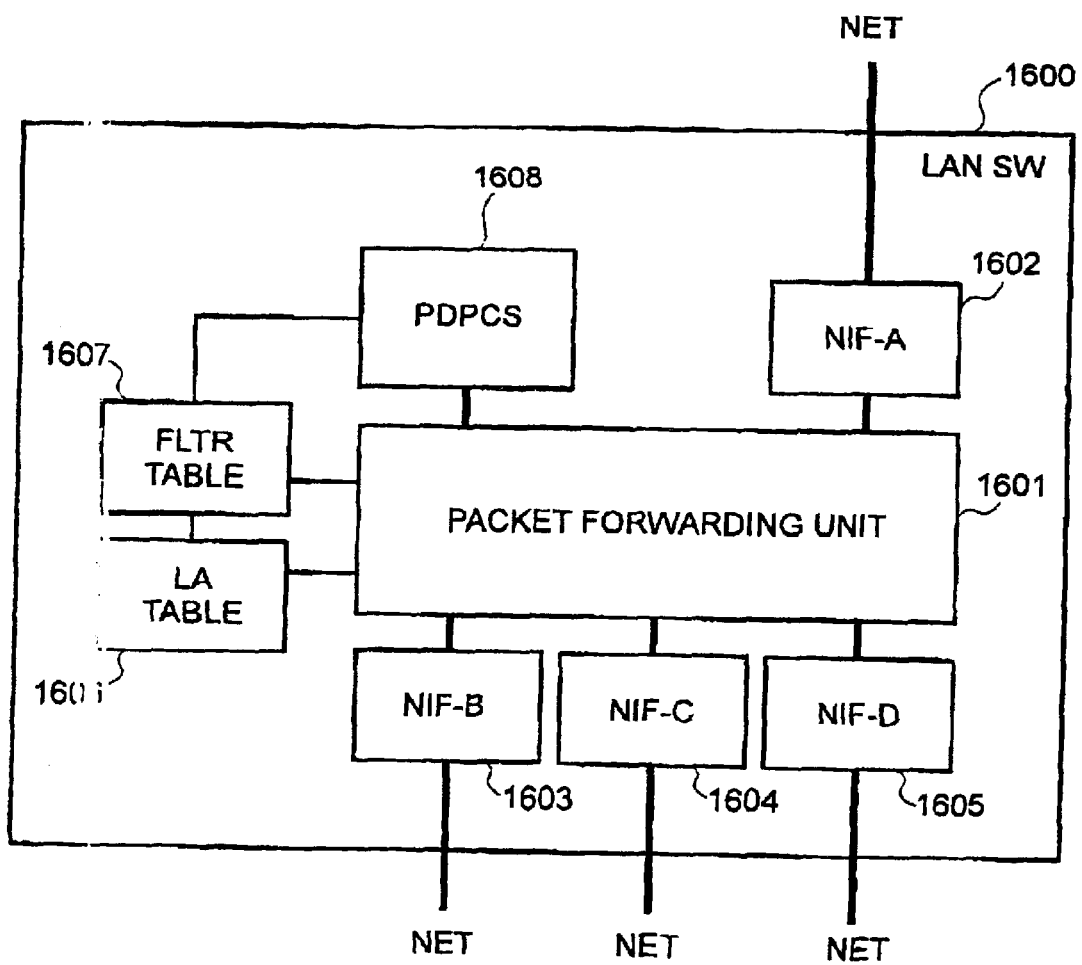
FIG. 16 is a structural diagram of a packet communications apparatus configured in accordance with a further preferred embodiment.

FIG. 16 is a structural diagram of a packet communications apparatus configured in accordance with a further preferred embodiment (third illustrative embodiment) of the present invention.

A LAN switch 1600 as the packet communications apparatus, for example, comprises a packet forwarding unit 1601, a plurality of network interfaces (NIFs) 1602 to 1605, a learned address table 1606, a filtering table 1607 and a processor for directive packets to change state (PDPCS) 1608. The NIFs 1602 to 1605 are assigned respective names (A to D as shown) for their unique identification. Instead of the names, numbers or the like may be used if the NIFs can uniquely be identified by them.

These NIFs 1602 to 1605 are respectively connected to different networks and perform packet sending/receiving. The networks are assumed compliant to 802.3 networks prescribed by the IEEE. In the following description, the NIF-A 1602 will be referred to as an "uplink" one and the NIFs B to D, 1603 to 1605 as "downlink" ones.

The packet forwarding unit 1601 performs forwarding of packets from a network to another network, according to the information held in the learned address table 1606 and filtering table 1607. The PDPCS 1608 receives a directive packet to change state from a server for authentication which will be described later and updates the contents of the filtering table 1607 and learned address table 1606. The directive packet to change state includes IP address and information indicating "permission/inhibition."

FIG. 17 illustrates a filtering table 1607 and entries.

In the filtering table 1607, information for identifying a packet not permitted to be forwarded is registered. The filtering table 1607 contains entries in a MAC address field 1701, an IP address field 1702, and a connection port field 1703. In the MAC address field 1701, a MAC address for which filtering is applied is registered. In the IP address field 1702, the IP address associated with the MAC address is registered. In the connection port field, 1703, the name of the NIF, any of 1602 to 1605, connected to a network to which the user terminal having the MAC address belongs is registered.

FIG. 18 illustrates a learned address table 1606 and entries (1).

In the learned address table 1606, information about the NIF through which a packet is forwarded is registered. The learned address table 1606 contains entries in a MAC address field 1801 and a connection port field 1802. In the MAC address field 1801, a MAC address that must exist in a packet to be forwarded is registered. In the connection port field 1802, the name of the NIF, any of 1602 to 1605, through which the LAN switch is to forward a packet including its destination MAC address that matches the content of the MAC address field is registered. Arrangement is made so that an entry that was not being referred to for a predetermined time is automatically deleted from the learned address table 1606.

Then, using a network system as will be shown in FIG. 19 as an example, the operation of the network system in which the LAN switch 1600 is used will be described below.

Figure 19:
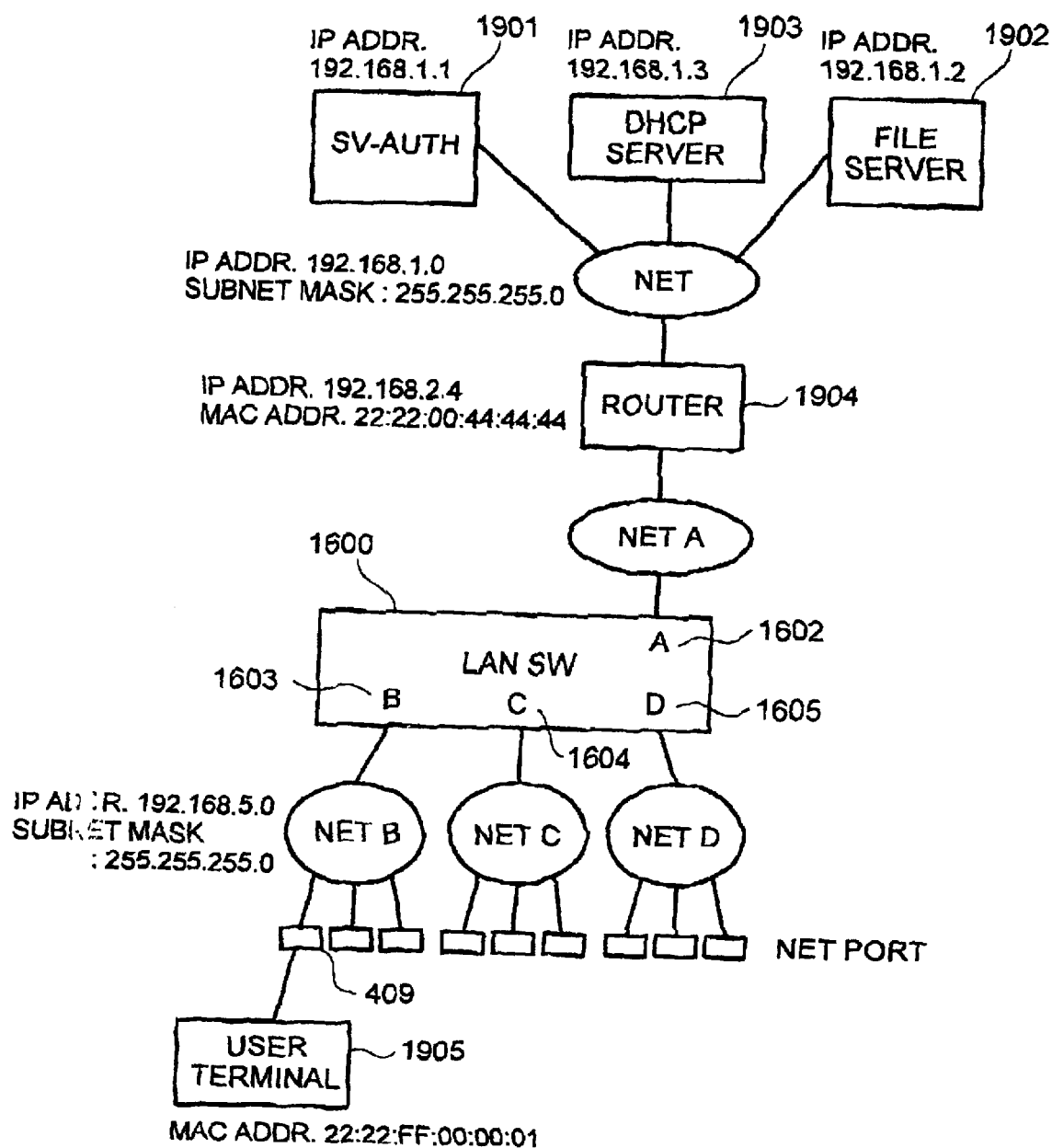
FIG. 19 is a topological schematic diagram of a network system in which a LAN switch 1600 is used.

FIG. 19 is a topological schematic diagram of the network system in which the LAN switch 1600 is used.

The present network system, for example, comprises the LAN switch 1600; networks A to D, respectively connected to the NIFs 1602 to 1605 of the LAN switch 1600; a plurality of network ports 409 linked via one of the networks B to D to one of the downlink NIFs B to D, 1603 to 1605, allowing end users to freely connect their terminal thereto; a representative user terminal 1905 connected via a network port 409 to the network B; a router 1904 connected via the network A to the uplink NIF-A; and a file server, a DHCP server 1903, and a server for authentication 1901 connected via a network to the router 1904.

The router 1904 has a BootP relay agent function and performs packet forwarding, based on the IP protocol. The DHCP server 1903 leases an IP address to a user terminal, base on the DHCP protocol. The server for authentication 1901 sends notice of the result of user authentication in a directive packet to change state to the LAN switch 1600.

In the present network system, each unit of equipment connected to a specific network is assigned an IP address belonging to the network (IP address designation as shown). A physical address (hereinafter represented as a MAC address) is set for the interface of each unit of equipment connected to a specific network. "MAC address" designation as shown will be referenced if necessary in the following description.

Then, assume that the user terminal 1905 has now been connected to the network port 409 of network B. This case will be discussed below.

Figure 20:
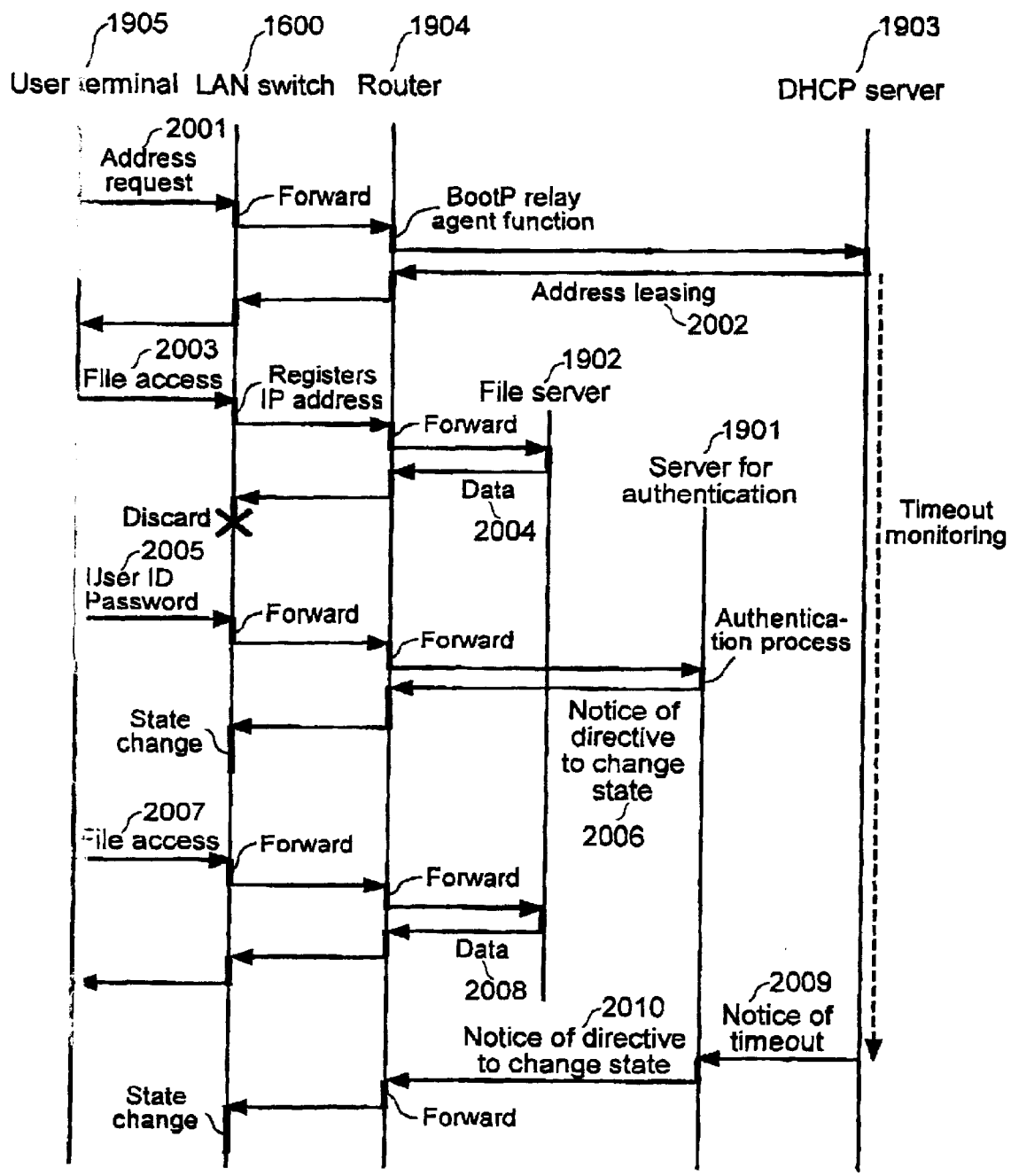
FIG. 20 is a diagram of communication sequence after the connection of a user terminal 1905 to a network port 409 of network B.

FIG. 20 is a diagram of communication sequence after the connection of the user terminal 1905 to the network port 409 of network B.

In the initial state, nothing is registered in the filtering tables 1607 of the LAN switch 1600. The learned address table 1606 has one set of entries: MAC address (22:22:00:44:44:44) of the router 1904 in the MAC address field 1801 and the name of the NIF-A 1602 in the connection port field 1802.

After the connection to the network port 409, first, the user terminal 1905 sends an address request packet 2001 for requesting the assignment of an IP address to it by following the DHCP protocol. In this case, the user terminal 1905 sends the packet 2001 having a broadcast address as the destination address. The packet 2001 is received by the NIF-B 1603 of the LAN switch 1600 and transferred to the packet forwarding unit.

When the LAN switch 1600 receives the packet 2001, a process of forwarding the packet begins, which will be explained below.

Figure 21:
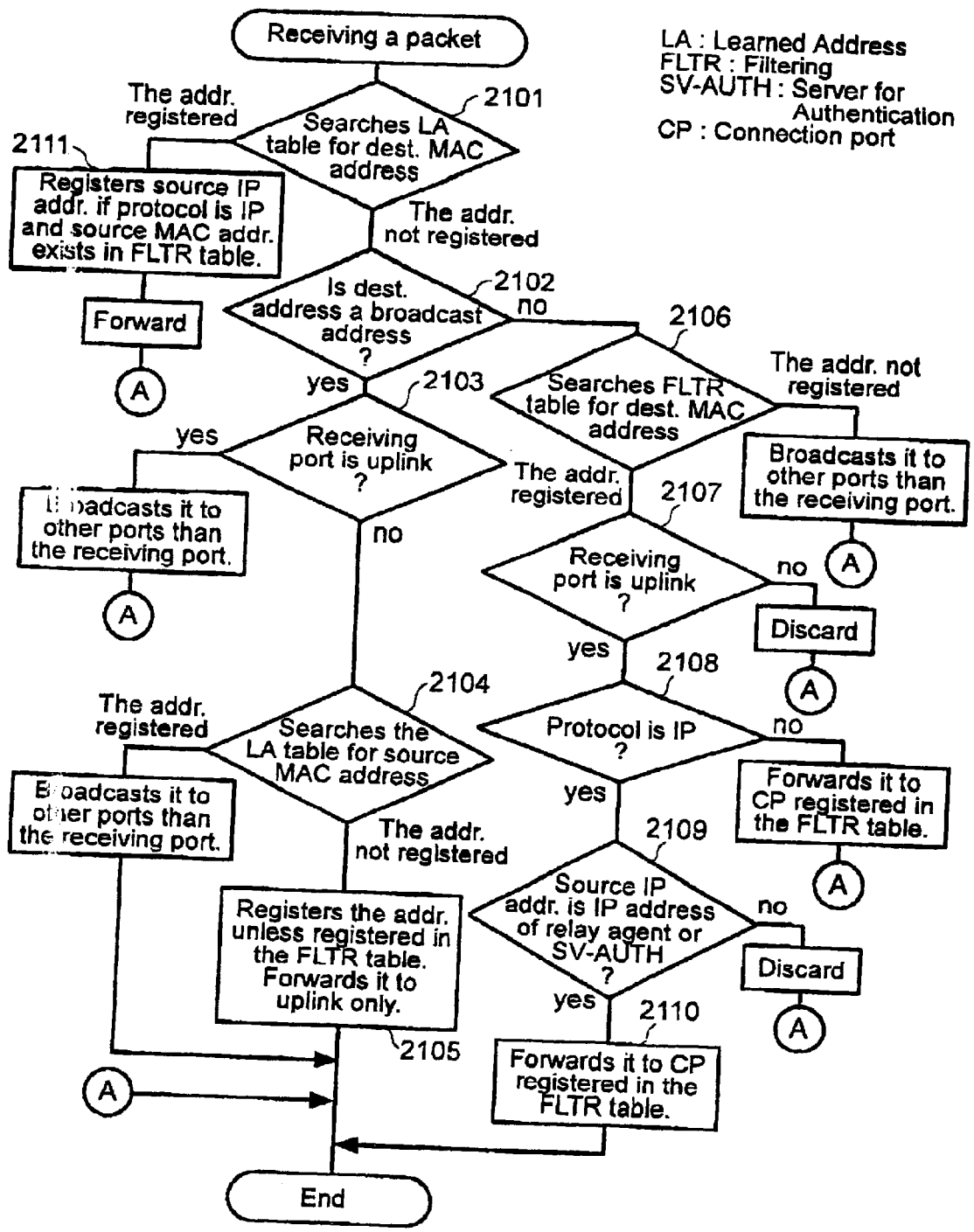
FIG. 21 is a flowchart illustrating how the LAN switch 1600 forwards a packet.

FIG. 21 is a flowchart illustrating how the packet forwarding unit 1601 of the LAN switch 1600 forwards the packet received.

Upon receiving the packet 2001, the packet forwarding unit 1601, which is abbreviated to PFU hereinafter, searches the learned address table 1606 for a registration matching the destination address of the packet 2001 (step 2101). Since the destination address is not registered in the learned address table 1606, the PFU judges whether the destination address is a broadcast address (step 2102). Since the destination address is a broadcast address, the PFU judges whether the receiving port is uplink (step 2103). Since the receiving port is NIF-B 1603 that is not uplink, the PFU searches the learned address table 1606 for a registration matching the source address of the packet 2001 (step 2104). The source address, the MAC address (22:22:FF:00:00:01) of the user terminal 1905 is not registered in the learned address table. Since that address is not registered in the filtering table 1607 as well, the PFU 1601 registers the MAC address (22:22:FF:00:00:01) of the user terminal 1905 into the MAC address field 1701 on one entry line in the filtering table 1607 (step 2105).

In this case, as illustrated in FIG. 17, the following are registered on the entry line in the filtering table 1607: information "unregistered" in the IP address field and "B" as the name of NIF-B 1603 in the connection port field 1703.

Then, the PFU 1601 forwards the packet 2001 to the uplink only, thus sending it to the router 1904 (step 2105).

Because the packet 2001 is the address request packet, it is forwarded to the DHCP server 1903 by the BootP relay agent function of the router 1904.

Referring to FIG. 20, an address leasing packet 2002 is sent back from the DHCP server 1903 to the router and further sent to the destination, MAC address (22:22:FF:00:00:01) of the user terminal 1905, by the BootP relay agent function of the router 1904.

The packet 2002 is received by the NIF-A 1602 of the LAN switch 1600 and transferred to the PFU 1601. The PFU 1601 begins the process of forwarding the packet 2002, according to the flowchart shown in FIG. 21. The PFU 1601 searches the learned address table 1606 for a registration matching the destination address of the packet 2002, namely, the MAC address (22:22:FF:00:00:01) of the user terminal 1905 (step 2101). Since the destination address is not registered in the learned address table 1606, the PFU judges whether the destination address is a broadcast address (step 2102). Since the destination address is not a broadcast address, the PFU searches the filtering table 1607 for a registration matching the destination address (step 2106). Since the MAC address of the user terminal 1905 is registered in the filtering table 1607, the PFU judges whether the receiving port is uplink (step 2107). Since the receiving port of the packet 2002 is NIF-A 1602 that is uplink, the PFU judges whether the communication protocol of the packet 2002 is IP protocol (step 2108). Since the communication protocol is IP protocol, the PFU judges whether the source IP address included in the packet 2002 is the IP address of the relay agent (router 1904) or the server for authentication (step 2109). Since the source IP address is the IP address of the relay agent (router 1904), the PFU 1601 forwards the packet 2002. In this case, the PFU 1601 refers to the filtering table 1607, entry #1, on the line of which the content of the MAC address field 1701 matches the destination address of the packet 2002. Since the connection port field 1703 on the entry #1 line contains a registration, the name of NIF-B1603, the PFU 1601 forwards the packet 2002 to the NIF-B 1603 and the packet is sent through the NIF-B 1603 (step 2110). Thereby, the address leasing packet 2002 is sent to the user terminal 1905. Now, assume that IP address "192.168.5.1" has just been leased to the user terminal 1905 from the DHCP server 1903.

Then, a case where access to the file server 1902 is attempted from the user terminal 1905 that is not yet user-authenticated by the server will be discussed below, wherein the IP protocol is used for the access.

In the network system shown in FIG. 19, the file server 1902 (IP address 192.168.1.2) and the user terminal 1905 (IP address 192.168.5.1) are separately connected to different subnets. Thus, a packet 2003 that the user terminal 1905 sends the file server 1902 for accessing the server includes the IP address (192.168.1.2) of the file server 1902 as the destination IP address and the MAC address (22:22:00:44:44:44) of the router 1904 as the destination MAC address. The packet 2003 is sent from the user terminal 1905 and received by the NIF-B 1603 of the LAN switch 1600. The NIF-B transfers the received packet 2003 to the PFU 1601.

After the LAN switch 1600 receives the packet 2003, how its PFU 1601 carries out the process of forwarding the packet will be explained below, using the flowchart shown in FIG. 21.

Upon receiving the packet 2003, the PFU 1601 searches the learned address table 1606 for a registration matching the destination MAC address of the packet 2003 step 2101). The destination address, the MAC address of the router 1904 is registered in the learned address table 1606. Thus, the PFU 1601 makes sure whether the communication protocol of the packet 2003 is IP protocol and whether the source MAC address included in the packet 2003 is registered in the filtering table 1607 (step 2111). The communication protocol of the packet 2003 is IP protocol and the source MAC address, the MAC address of the user terminal 1905 is registered in the filtering table 1607. Thus, the PFU 1601 registers the source IP address included in the packet 2003 into the IP address field 1702 on the entry line on which the MAC address of the user terminal 1905 has been registered in the filtering table 1607 (step 2111). In this case, originally, information "unregistered" has been registered in the IP address field 1702 on the entry line on which the MAC address of the user terminal 1905 has been registered in the filtering table 1607 as illustrated in FIG. 17. Consequently, that information is replaced by the source IP address included in the packet 2003. The source IP address included in the packet 2003 is the IP address (192.168.5.1) leased to the user terminal 1905 from the DHCP server 1903.

Then, the PFU 1601 forwards the packet 2003 to the unlink, according to the content of the connection port field 1802 on the entry line on which the destination MAC address has been registered in the learned address table 1606. The packet 2003 is sent to the router 1904 through the uplink. The router 1904 forwards the packet 2003 to the file server 1902, pursuant to the IP protocol specifications.

Upon receiving the packet 2003, the file server 1902 sends a reply packet 2004 including data requested by the user terminal 1905. The router 1904 receives the packet 2004 and forwards it to the LAN switch 1600. The NIF-A 1602 of the LAN switch 1600 receives the packet 2004 and transfers it to the PFU 1601.

After the LAN switch 1600 receives the packet 2004, how its PFU 1601 carries Out the process of forwarding the packet will be explained below, according to the flowchart shown in FIG. 21.

The packet 2004 includes the MAC address (22:22:FF:00:00:01) of the user terminal 1905 as the destination MAC address, the IP address (192.168.5.1) of the ever terminal 1905 as the destination IP address and the IP address (192.168.1.2) of the file server 1902 as the source IP address.

First, the PFU 1601 searches the learned address table 1606 for a registration matching the destination MAC address of the packet 2004 (step 2101). Since the destination MAC address is not registered in the learned address table 1606, the PFU judges whether the destination MAC address is a broadcast address (step 2102). Since the destination MAC address is not a broadcast address, the PFU searches the filtering table 1607 for a registration matching the destination MAC address (step 2106). Since the MAC address of the user terminal 1905 is registered in the filtering table 1607, the PFU judges whether the receiving port is uplink (step 2107). Since the receiving port of the packet 2004 is NIF-A 1602 that is uplink, the PFU judges whether the communication protocol of the packet 2004 is IP protocol (step 2108). Since the communication protocol is IP protocol, the PFU judges whether the source IP address included in the packet 2004 is the IP address of the relay agent (router 1904) or the server for authentication (step 2109). Since the source IP address is the IP address of the file server 1902, the PFU discards the packet 2004 (step 2109). In fact, the packet 2004 is not sent from the LAN switch 1600 to the user terminal 1904. Consequently, the access from the user terminal 1905 to the file server 1902 is unsuccessful.

Next, a procedure in which the user terminal 1905 is user-authenticated by the server for authentication will be explained below.

To gain authentication by the server for authentication 1901, the user inputs user ID and password to the user terminal 1905. The user terminal 1905 sends the server for authentication 1901 a packet 2005 including the input user ID and password. In this case, the server for authentication (IP address 192.168.1.1) and the user terminal 1905 (IP address 192.168.5.1) separately belongs to different subnets. Thus, the packet 2005 includes the IP address (192.168.1.1) of the server for authentication 1901 as the destination IP address and the MAC address (22:22:00:44:44:44) of the router 1904 as the destination MAC address. The packet 2005 is sent from the user terminal 1905 and received by the NIF-B 1603 of the LAN switch 1600. The NIF-B transfers the received packet 2005 to the PFU 1601.

After the LAN switch 1600 receives the packet 2005, how its PFU 1601 carries out the process of forwarding the packet will be explained below, using the flowchart shown in FIG. 21.

Upon receiving the packet 2005, the PFU 1601 searches the learned address table 1606 for a registration matching the destination MAC address of the packet 2005 (step 2101). The destination address, the MAC address of the router 1904 is registered in the learned address table 1606. Thus, the PFU 1601 makes sure whether the communication protocol of the packet 2005 is IP protocol and whether the source MAC address included in the packet 2005 is registered in the filtering table 1607 (step 2111). The communication protocol of the packet 2005 is IP protocol and the source MAC address, the MAC address of the user terminal 1905 is registered in the filtering table 1607. Moreover, the source IP address included in the packet 2005 is also registered in the filtering table 1607. Thus, the PFU 1601 forwards the packet 2005 to the uplink, according to the content of the connection port field 1802 on the entry line on which the destination MAC address has been registered in the learned address table 1606. The packet 2005 is sent to the router 1904 through the uplink. The router 1904 forwards the packet 2005 to server for authentication 1901, pursuant to the IP protocol specifications.

On the server for authentication 1901, if t are those that it holds as those of the user authorized to use networking service, the server he user ID and password included in the packet 2005 sent from the user terminal 1905 sends a directive packet to change state, addressing it to the PDPCS 1608 of the LAN switch 1600. The directive packet to change state 2006 includes the IP address (192.168.5.1) of the user terminal 1905 and information "permission." The router 1904 forwards the directive packet to change state 2006 to the LAN switch 1600. The NIF-A 1602 of the LAN switch 1600 receives the directive packet to change state 2006 and transfers it via the PFU 1601 to he PDPCS 1608. Upon receiving the directive packet to change state 2006, the PDPCS 1608 searches the filtering table 1607 for the IP address (192.168.5.1) included in the packet 2006. After searching out the IP address (192.168.5.1) entry from the filtering table 1607, the PDPCS 1606 reads the associated MAC address (22:22:FF:00:00:01) and connection port name (B) on the entry line from the MAC address field 1701 and connection port field 1703. The PDPCS 1608 adds a new entry line to the learned address table 1606 and registers the above MAC address and connection port name into the respective fields on the entry line.

Figure 22:
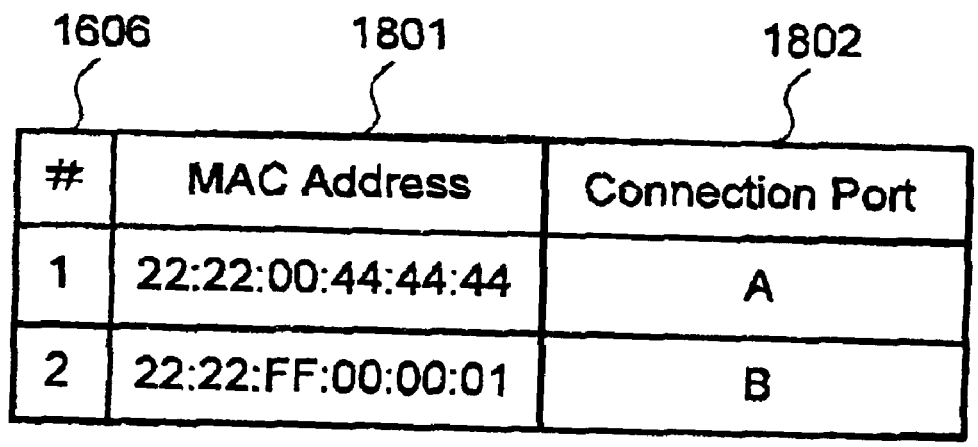
FIG. 22 illustrates the learned address table 1606 and updated entries.

FIG. 22 illustrates the learned address table 1606 and entries (2). As illustrated in FIG. 22, the learned address table 1606 includes entry #2 and new entries of MAC address (22:22:FF:00:00:01) and connection port name (B).

After being user-authenticated by the server for authentication 1901, when the user terminal 1905 sends a packet 2007 to the file server 1902 again for accessing the server, the packet 2007 is forwarded via the LAN switch 1602 and the router 1904 and sent to the file server 1902.

Upon receiving the packet 2007, the file server 1902 sends back a reply packet 2008 including data requested by the user terminal 2905. The router 1904 receives the packet 2008 as and forwards it to the LAN switch 1600. The NIF-A 1602 of the LAN switch 1600 receives the packet 2008 and transfers it to the PFU 1601. Upon receiving the packet 2008, the PFU 1601 carries out the process of forwarding the packet in accordance with the flowchart shown in FIG. 21, which will be explained below.

The packet 2008 includes the MAC address (22:22:FF:00:00:01) of the user terminal 1905 as the destination MAC address, the IP address (192.168.5.1) of the user terminal 1905 as the destination IP address, and the IP address (192.168.1.2) of the file server 1902 as the source IP address.

The PFU 1601 searches the learned address table 1606 for a registration matching the destination MAC address of the packet 2008, namely, the MAC address of the user terminal 1905 (step 2101). Because the destination MAC address is the MAC address (22:22:FF:00:00:01) of the user terminal 1905, it is registered in the learned address table 1606 as illustrated in FIG. 22. Thus, the PFU 1601 makes sure whether the communication protocol of the packet 2008 is IP protocol and whether the source MAC address included in the packet 2008 is registered in the filtering table 1607 (step 2111). Since the communication protocol of the packet 2008 is IP protocol, but the source MAC address, the MAC address of the router 1904 is not registered in the filtering table 1607, the PFU registers nothing into the filtering table 1607. Then, the PFU 1601 forwards the packet 2008 to the NIF-B 1603, according to the content of the connection port field 1802 on the entry line on which the destination MAC address has been registered in the learned address table 1606. The packet 2008 is sent to the user terminal 1905 through the NIF-B 1603. Thereby, an access path from the user terminal 1905 to the file server 1902 has been established.

After being user-authenticated, if the user terminal 1905 remains not communicating with the file server for a predetermined time, the entry (entry #2) is automatically deleted from the learned address table 1606. Consequently, the user terminal 1905 becomes impossible to access the file serer 1902 and continues to be impossible until it is user-authenticated by the server for authentication again. The DHCP server 1903 leases an address and usually a time limit of using the lease address is set. On the elapse of a predetermined time after the DHCP server 1903 leases an address to the user terminal 1905, when the time limit of using the address expires, the DHCP server 1903 sends the server for authentication 1901 notice of timeout 2009. Upon receiving the notice of timeout 2009, the server for authentication sends a directive packet to change state 2010 including the IP address (192.168.5.1 in this case) whereof the time limit of use expires and information "inhibition," addressing it to the PDPCS 1608 of the LAN switch 1600. The router 1904 forwards the directive packet to change state 2010 to the LAN switch 1600. The NIF-A 1602 of the LAN switch 1600 receives the directive packet to change state 2010 and transfers it via the PFU 1601 to the PDPCS 1608. Upon receiving the directive packet to change state 2010, the PDPCS 1608 searches the filtering table 1607 for the IP address (192.168.5.1) included in the packet 2010. After searching out the IP address (192.168.5.1) entry from the filtering table 1607, the PDPCS 1608 reads the associated MAC address (22:22:FF:00:00:01) on the entry line from the MAC address field 1701. Furthermore, the PDPCS 1608 searches the learned address table 1606 for the above MAC address and finds out the MAC address entry. From both the filtering table 1607 and the learned address table 1606, the PDPCS 1608 deletes the line or the entry it searched out. In consequence, the user terminal 1905 becomes impossible to access the file server 1902 and continues to be impossible unless it is user-authenticated again.

As described above, by using the LAN switch 1600, a network system can be built that prevents an unauthenticated user terminal 1905 from accessing the file server 1902, whereas permits an authenticated user terminal 1905 to access the file server 1902. If a user terminal connected to a network port remains in a non-communicating status for a predetermined time, and if the time limit of using the address leased to a user terminal expires, the table in the LAN switch 1600 is automatically modified to disable the terminal in networking use so that the LAN switch can prevent the user terminal from accessing the file server 1902 until it is user-authenticated again.

Figure 23:
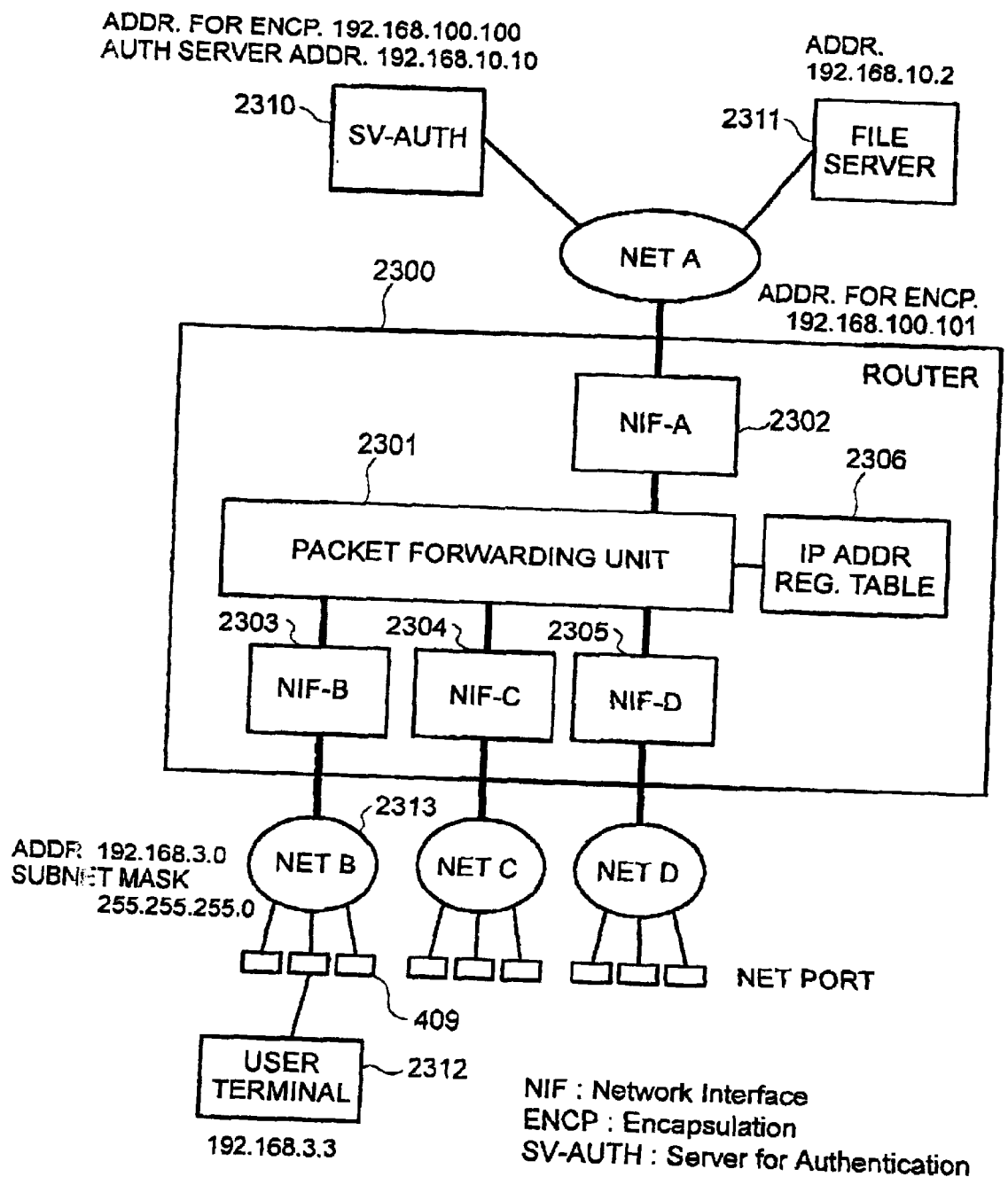
FIG. 23 is a topological schematic diagram of a network system in which a router 2300 is used.

FIG. 23 is a topological schematic diagram of a network system in which a router 2300 is used as the packer communications apparatus.

The router 2300, for example, comprises a plurality of NIFs A to D, 2302 to 2305, a packet forwarding unit (PFU) 2301, and an IP address registration table 2306.

The PFU 2301 performs packet forwarding, pursuant to the IP protocol. The PFU 2301 encapsulates packets from a user terminal having an IP address not registered in the IP address registration table 2306. The NIFs A to D, 2302 to 2305 are respectively connected to different networks and perform packet sending/receiving. In the IP address registration table 2306, the IP address of an authenticated user terminal is registered.

The present network system, for example, comprises the router 2300; a server for authentication 2310 and a file server 2311 connected via network A to the NIF-A 2302 of the router 2300; a plurality of network ports 409 linked via one of networks B to D to one of the NIFs B to D, 2303 to 2305, allowing end users to freely connect their terminal thereto; and a representative user terminal 2312 connected via a network port 409 to network B 2313. The server for authentication 2310 performs user authentication, notifies the router 2300 of the result thereof, and performs sending/receiving of encapsulated packets which will be described later.

Then, in the present network system, assume that the user terminal 2312 has now been connected to the network port 409 connected to network B 2313. This case will be discussed below.

Figure 24:
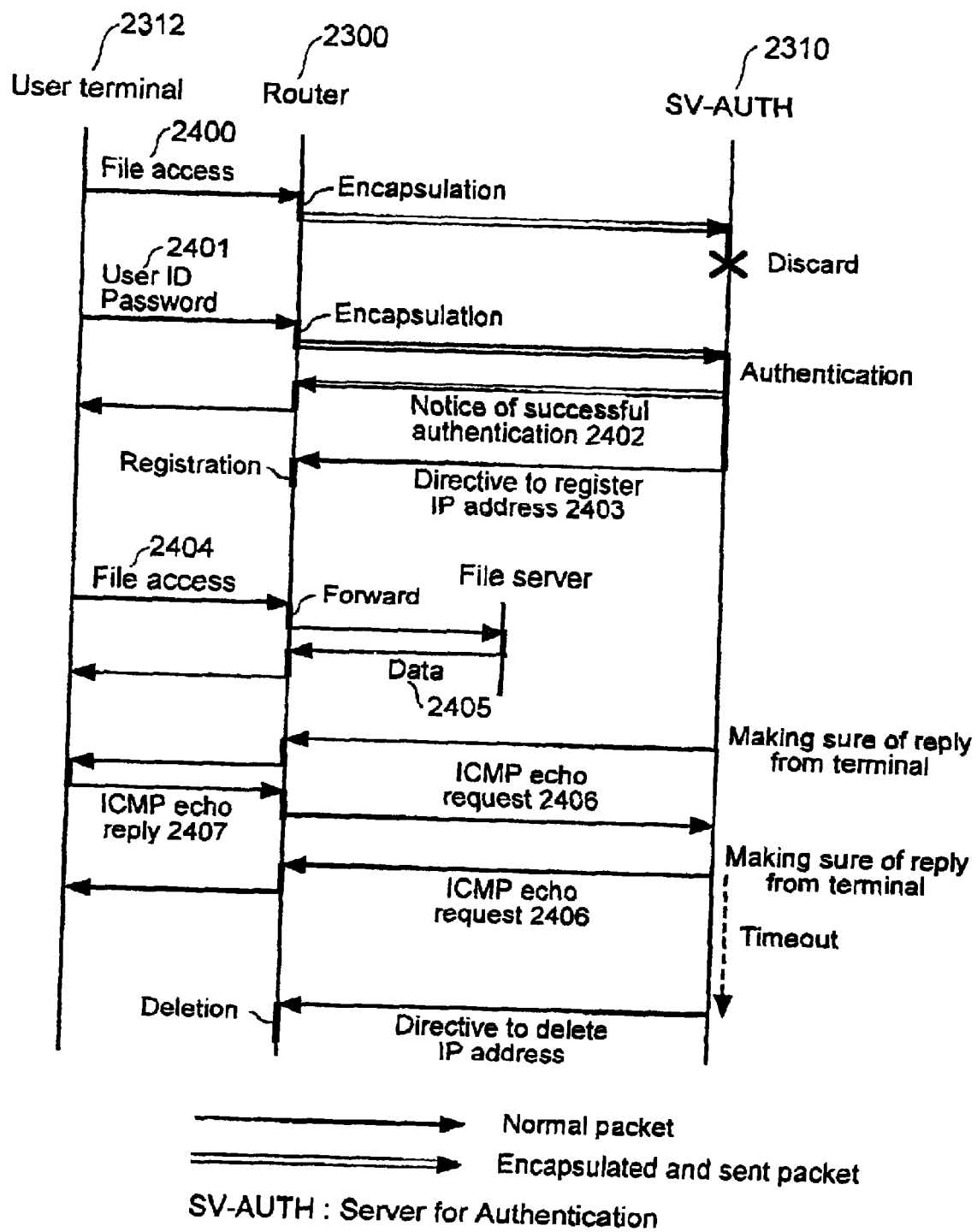
FIG. 24 a diagram of communication sequence after the connection of a user terminal 2312 to a network port connected to network B 2313.
Figure 27:
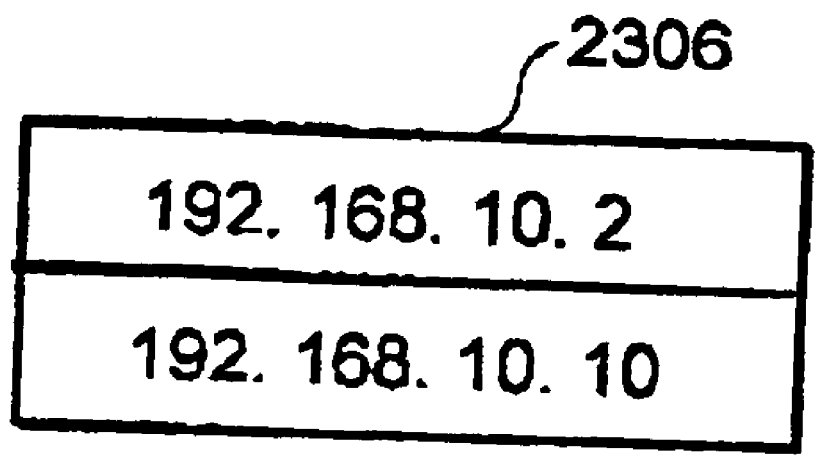
FIG. 27 illustrates an IP address registration table 2306 and entries in the initial state.

FIG. 27 illustrates the IP address registration table 2306 and entries in the initial state. FIG. 24 is a diagram of communication sequence after the user makes the connection of the user terminal 2312 to the network port 409.

To access the file serer 2311, the user terminal 2312 that is not yet user-authenticated sends a packet 2400, addressing it to the IP address (192.168.10.2) of the file server 2311.

In this case, the packet 2400 is received by the NIF-B 2303 of the router 2300 and transferred to the PFU 2301. The PFU 2301 receives the packet 2400 from the user terminal 2312 and begins the process of forwarding the packet.

Figure 25:
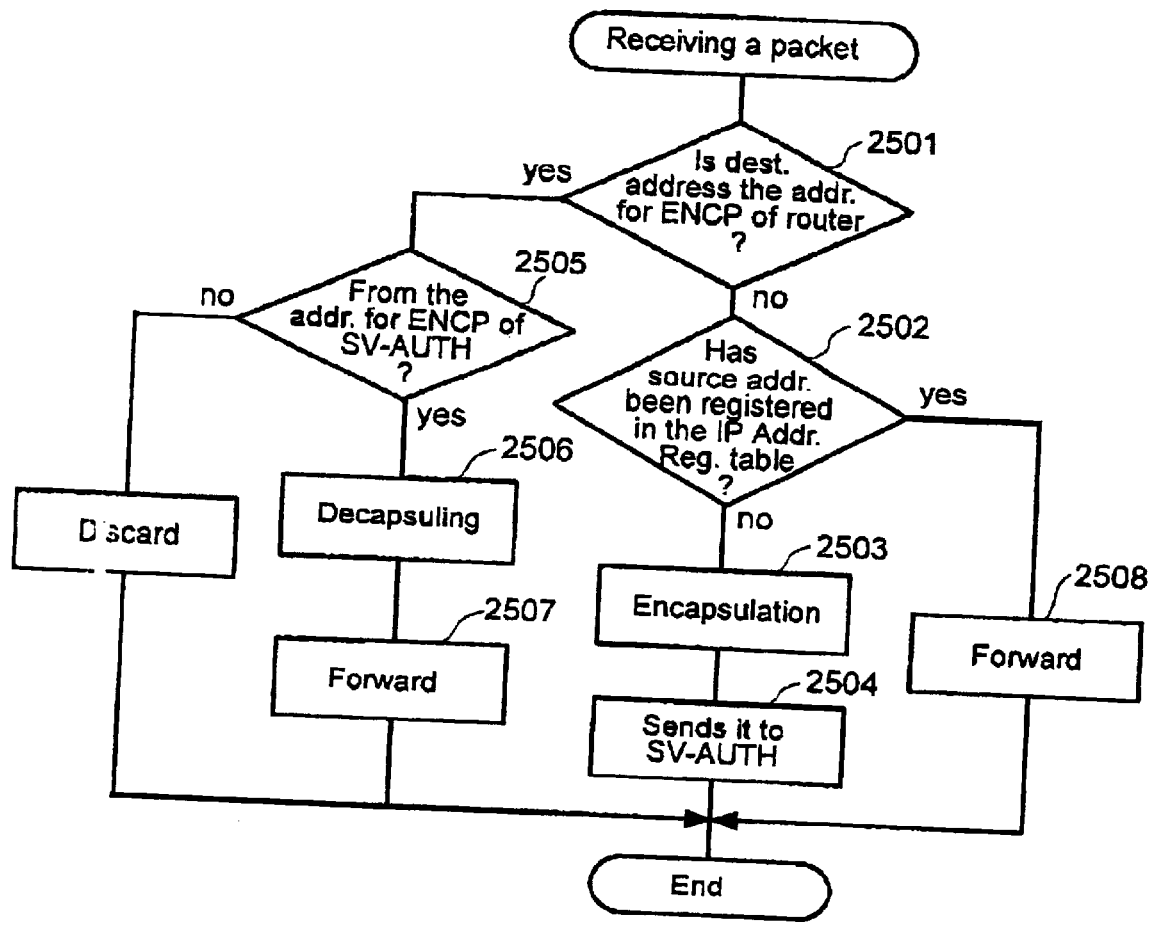
FIG. 25 is a flowchart illustrating how the router 2300 forwards a packet.

FIG. 25 is a flowchart of how the PFU 2301 of the router 2300 forwards a packet.

Upon receiving the packet 2400, the PFU 2301 judges whether the destination address of the packet 2400 is the address for encapsulation of the router 2300 (step 2501). The destination address of the packet 2400 is the IP address of the file server 2311, not the address for encapsulation of the router. Then, the PFU searches the IP address registration table 2306 to judge whether the source address of the packet 2400 has been registered in the table (step 2502). Since the source address, the IP address of the user terminal 2312 is not registered in the IP address registration table 2306, the PFU 2301 encapsulates the packet 2400 (step 2503).

Hereupon, encapsulation is specifically that the PFU regards the entire packet 2400 including its IP header as one data and to the data, attaches another IP header specifying the address for encapsulation (192.168.100.100) of the server for authentication 2310 as the destination address and the address for encapsulation (192.168.100.101) of the router 2300 as the source address, thus generating a new packet (encapsulated packet). Consequently, the encapsulated packet is sent to the server for authentication 2301, no matter what is the original destination address (e.g., the IP address of the file server 2311) (step 2504).

Now, how the server for authentication 2310 handles the encapsulated packet it received will be explained.

Figure 26:
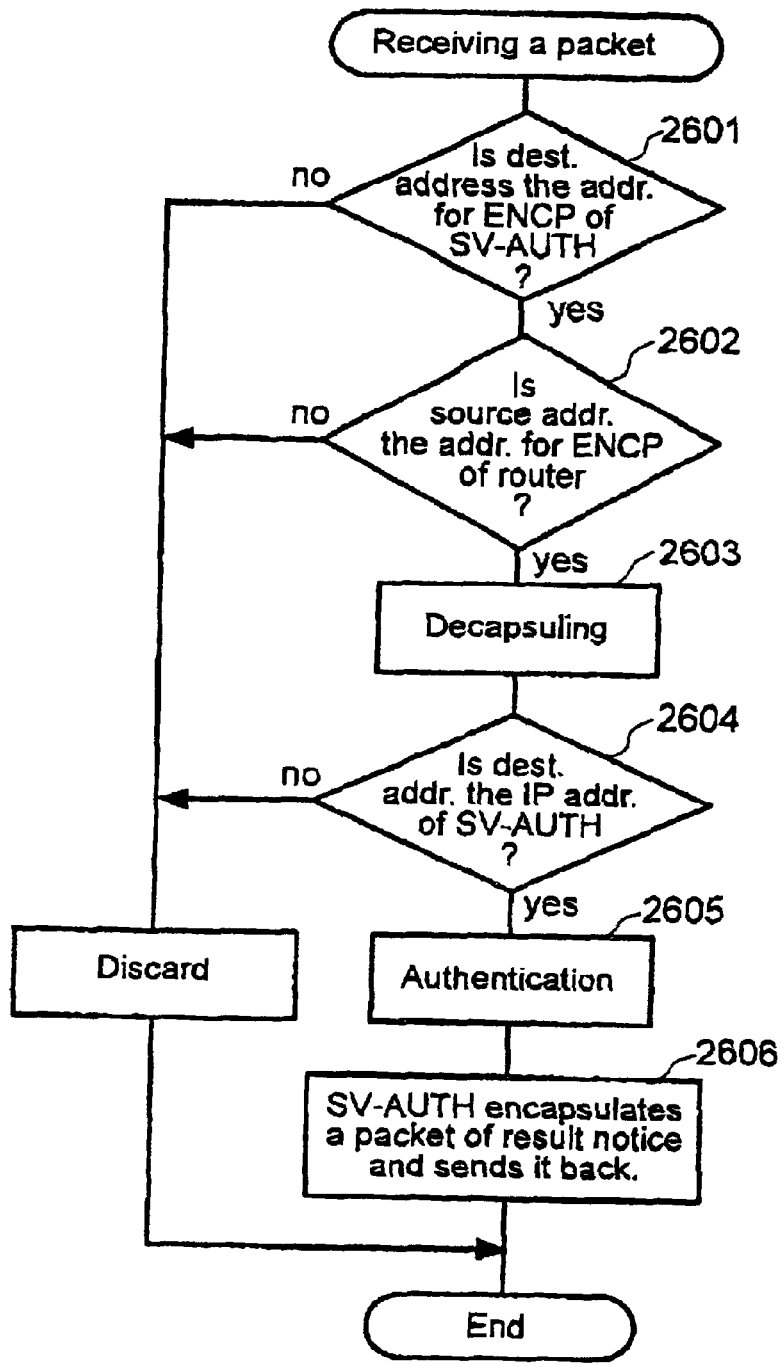
FIG. 26 is a flowchart illustrating how a server for authentication 2310 handles a packet it received.

FIG. 26 is a flowchart illustrating how the server for authentication 2310 handles a packet it received.

Upon receiving the encapsulated packet, the server for authentication 2319, which is abbreviated to SV-AUTH hereinafter, judges whether the destination address of the packet is the address for encapsulation of the SV-AUTH (step 2601). Since the destination address of the encapsulated packet is the address for encapsulation of the SV-AUTH, the SV-AUTH judges whether the source address of the packet is the address for encapsulation of the router 2300 (step 2602). Since the source address is the address for encapsulation of the router, the SV-AUTH decapsules the received packet and recovers the original packet 2400 (step 2603). Decapsuling is specifically that the SV-AUTH removes the IP header from the encapsulated packet, thus taking back the packet 2400 before being encapsulated, equivalent to the data included in the encapsulated packet.

Then, the SV-AUTH 2310 judges whether the destination address of the decapsuled packet 2400 is the IP address of the SV-AUTH (step 2604). The destination address of the packet 2400 is the IP address of the server 2311, not the IP address of the SV-AUTH 2310. Thus, the SV-AUTH 2310 discards the packet 2400.

In consequence, the unauthenticated user terminal 2312 cannot access the file server 2311.

Then, a procedure in which the user terminal 2312 is user-authenticated by the SV-AUTH 2310 will be explained below, using FIGS. 24 and 25.

To gain authentication by the SV-AUTH 2310, the user inputs user ID and password to the user terminal 2312. The user terminal 2312 sends the SV-AUTH 2310 a packet 2401 including the input user ID and password. The packet 2401 is received by the NIF-B 2303 of the router 2300. The NIF-B 2303 transfers the received packet 2401 to the PFU 2301.

Upon receiving the packet 2401, the PFU 2301 of the router 2300 carries out the process of forwarding the packet, which will be explained below, using the flowchart shown in FIG. 25.

Upon receiving the packet 2401, the PFU 2301 judges whether the destination address of the packet 2401 is the address for encapsulation of the router 2300 (step 2501). The destination address of the packet 2401 is the IP address of the SV-AUTH 2310, not the address for encapsulation of the router. Then, the PFU searches the IP address registration table 2306 to judge whether the source address of the packet 2401 has been registered in the table (step 2502). Since the source address, the IP address of the user terminal 2312 is not registered in the IP address registration table 2306, the PFU 2301 encapsulates the packet 2401 (step 2503). Then, the PFU 2301 sends the encapsulated packet to the SV-AUTH 2310 (step 2504).

As illustrated in FIG. 26, upon receiving the encapsulated packet, the SV-AUTH 2310 judges whether the destination address of the packet is the address for encapsulation of the SV-AUTH (step 2601). Since the destination address of the encapsulated packet is the address for encapsulation of the SV-AUTH, the SV-AUTH judges whether the source address of the packet is the address for encapsulation of the router 2300 (step 2602). Since the source address is the address for encapsulation of the router, the SV-AUTH decapsules the received packet and recovers the original packet 2401 (step 2603). Then, the SV-AUTH 2310 judges whether the destination address of the decapsuled packet 2401 is the IP address of the SV-AUTH (step 2604). Since the destination address of the packet 2401 is the IP address of the SV-AUTH 2310, the SV-AUTH carries out authentication (step 2605). In the authentication step, the SV-AUTH 2310 compares the user ID and password included in the packet 2401 with those that it holds as those of the user authorized to use networking service for a match. If the match is made certain, the SV-AUTH generates a packet 2402 for notice of successful user authentication of the user terminal 2312, encapsulates the packet 2402 and sends it back (step 2606). The packet 2402 has its IP header specifying the IP address of the user terminal 2312 as the destination address. Encapsulation by the SV-AUTH 2310 is specifically that the SV-AUTH attaches another IP header specifying the address for encapsulation (192.168.100.101) of the router 2300 as the destination address and the address for encapsulation (192.168.100.100) of the SV-AUTH 2310 as the source address to the packet 2402, thus generating a new packet (encapsulated packet). Thus, the encapsulated packet is sent to the router 2300.

The encapsulated packet is received by the NIF-A 2302 and transferred to the PFU 2301. According to the flowchart shown in FIG. 25, the PFU 2301 judges whether the destination address of the received packet is the address for encapsulation of the router (step 2501). Since the destination address is the address for encapsulation of the router 2300, the PFU judges whether the source address is the address for encapsulation of the SV-AUTH 2310 (step 2505). Since the source address is the address for encapsulation of the SV-AUTH 2310, the PFU 2301 decapsules the received packet and recovers the original packet 2402 (step 2506). Then, the PFU 2301 forwards the packet 2402 (step 2507), thus sending it to the user terminal 2312.

Upon the successful authentication of the user of the user terminal 2312, the SV-AUTH 2310 sends the router 2300 a directive packet 2403 to register the IP address (192.168.3.3) of the user terminal 2312 into the IP address registration table 2306.

The packet 2403 is received by the NIF-A 2302 and transferred to the PFU 2301. Upon receiving the packet 2403, the PFU 2301 registers the IP address (192.168.3.3) of the user terminal 2312 into the IP address registration table 2306, following the directive in the packet 2403.

Assume that, after being user-authenticated, the user terminal 2312 accesses the file server 2311, and this case will be discussed below.

To access the file server 2311, the user terminal 2312 sends a packet 2404, addressing it to the IP address (192.168.10.2) of the file server 2311. The packet 2404 is received by the NIF-B 2303 of the router 2300 and transferred to the PFU 2301. As illustrated in FIG. 25, upon receiving the packet 2404, the PFU 2301 judges whether the destination address of the packet 2404 is the address for encapsulation of the router 2300 (step 2501). The destination address of the packet 2404 is the IP address of the file server 2311, not the address for encapsulation of the router. Then, the PFU searches the IP address registration table 2306 to judge whether the source address of the packet 2404 has been registered in the table (step 2502). Since the source address, the IP address of the user terminal 2312 is registered in the IP address registration table 2306, the PFU 2301 of the router forwards the packet 2404 (step 2508), thus sending the packet 2404 to the file server 2311.

Upon receiving the packet 2404, the file server 2311 sends back a replay packet 2405 including data requested by the user terminal 2312. The packet 2405 is received by the NIF-A 2302 and transferred to the PFU 2301. The PFU 2301 judges whether the destination address of the packet 2405 is the address for encapsulation of the router 2300 (step 2601). The destination address of the packet 2405 is the IP address of the user terminal 2312, not the address for encapsulation of the router. Then, the PFU searches the IP address registration table 2306 to judge whether the source address of the packet 2405 has been registered in the table (step 2502). The source address, the IP address (192.168.10.2) of the file server 2311 is registered in the IP address registration table 2306. Thus, the PFU 2301 of the router forwards the packet 2405 (step 2508), thus sending the packet 2405 to the user terminal 2312. As described above, the user terminal 2312 becomes possible to access the file server 2311 after being user-authenticated by the SV-AUTH 2310.

After the successful authentication of the user of the user terminal 2312, the SV-AUTH 2310 periodically sends the user terminal 2312 an ICMP echo request 2406 conforming to the Internet Control Message Protocol (ICMP). The SV-AUTH makes sure that an ICMP echo reply 2407 which is reply data to the ICMP echo request 2406 is sent back from the user terminal 2312.

If the ICMP echo reply 2407 is not sent back within a predetermined time after sending the ICMP echo request 2406, the SV-AUTH 2310 sends the route 2300 a directive placket to delete the IP address (192.168.3.3) of the user terminal 2312 from the IP address registration table. The directive packet is received by the NIF-A 2302 and transferred to the PFU 2301. Upon receiving the directive packet, the PFU 2301 deletes the IP address (192.168.3.3) of the user terminal 2312 from the IP address registration table 2306, following the directive in the packet. In consequence, the user terminal 2312 becomes impossible to access the file server 2311 and continues to be impossible until it is user-authenticated again.

As described above, by using the router 2300, a network system can be built that prevents an unauthenticated user terminal 2312 from accessing the file server 2311, whereas permits an authenticated user terminal 2312 to access the file server 2311. Furthermore, the SV-AUTH 2310 makes sure whether an ICMP echo reply 2407 is periodically received from the user terminal 2311. No arrival of an ICMP echo reply indicates that the user terminal 2311 is disconnected from the network or stops using the network. If this happens, the IP address of the user terminal 2311 is automatically deleted from the IP address registration table 2306, so that further access from the user terminal 2311 to the file service 2311 can be prevented.

Figure 28:
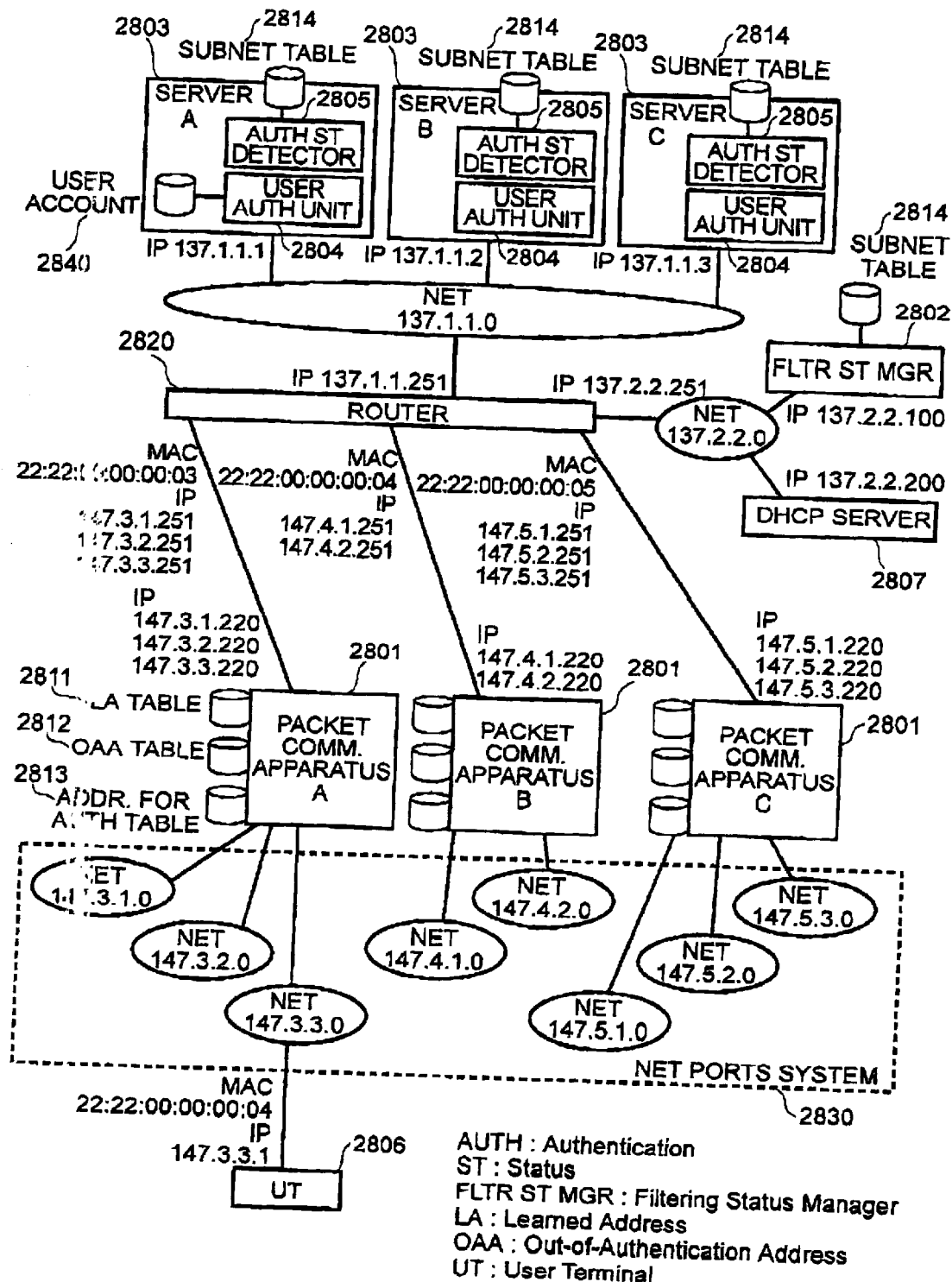
FIG. 28 is a topological schematic diagram of a network system wherein a plurality of networks are interconnected via a plurality of packet communications apparatuses A to C 2801 and a route 2820.

FIG. 28 is a topological schematic diagram of a network system wherein a plurality of networks are interconnected via a plurality of packet communications apparatuses A to C 2801 and a route 2820.

The present network system, for example, comprises the packet communications apparatuses A to C 2801; the route 2820 connected to the packet communications apparatuses A to C 2801; servers A to C 2803, a filtering status manager 2802, and a DHCP server 2807 which are connected to the router 2820 via one of separate networks (IP subnets); a network ports system 2830 comprising one or more networks (IP subnets) linked to one of the packet communications apparatuses A to C 2801; and one or more user terminals 2806 which is connected to any network in the network ports system 2830. Each of the packet communications apparatuses A to C 2801 has a learned address 2811, an out-of-authentication address table 2812, and an address for authentication table 2813 and performs forwarding or filtering (discard) of packets sent from the user terminal 2806 connected to the network ports system 2830. The packet communications apparatuses A to C 2801 are LAN switches performing packet forwarding on the data link layer in the OSI reference model. Each of the packet communications apparatuses A to C 2801 has a DHCP relay agent function and the IP addresses corresponding to the IP subnets linked to it.

Each of the servers A to C 2803 comprises a user authentication unit 2804 and an authentication status detector 2805. The user authentication unit 2804 has a user account table 2840 to contain user identification information. The authentication status detector 2805 has a subnet table 2814. The user authentication unit 2804 is installed as software implementation to be run on the hardware (personal computer) of each of the servers A to C 2803. While a login function provided by the operating system (OS) of the server is used as the user authentication unit 2804, other authentication means may be used, for example, supplying a World Wide Web (WWW) page to prompt the user to enter a password. If there are a plurality of user authentication units 2804 in the network system, a common mean for user authentication may be implemented for all the units or different means for user authentication may be implemented for different units. The authentication status detector 2805 is also installed as software implementation to be run on each of the servers A to C 2803. Whenever the user authentication unit 2804 completes a procedure of authentication (login), it notifies the authentication status detector 2805 of the IP address of a successfully authenticated user terminal.

The filtering status manager 2802 has a subnet table 2814. The filtering status manager 2802 communicates with the authentication status detector 2805 of each of the servers A to C 2803 and each of the packet communications apparatuses 2801 via the networks.

In the present network system, an end user can connect the user terminal (a notebook-size personal computer or the like) to any of the one or more networks (IP subnets 147.3.1.0 to 147.5.3.0) in the network ports system 2830 so that the user can use the network system.

In the network system, it is assumed that all communication is performed, pursuant to the IP protocol (IPv4). However, the network system may be operated, using any other communication protocol (for example, IPv6). An IP subnet number is assigned to each of the networks (IP subnets). It is assumed that all subnet masks are 24 bits in length. A unit of equipment connected to one of the networks is assigned the IP address belonging to the network. Such IP address is shown as IP address designation in FIG. 28. All the networks are 802.3 networks of CSMA/CD type, the specifications thereof being prescribed by the IEEE. However, other types of networks may be used as the networks shown. A physical address (hereinafter represented as a MAC address) is set for each interface of each unit of equipment connected to a specific network. MAC address designation as shown in FIG. 28 will be referenced if necessary in the following description.

Information setting on each unit of equipment in the initial state when no user terminal 2806 is connected to the network ports system 2830 will be explained below.

In the user authentication unit 2804, the user ID and password of a user authorized to use networking service are registered for all users authorized heretofore. Because the user authentication (login) function of the server OS is used as the user authentication unit 2804, such registration information is retained as the user accounts 2840 under the management of the server OS. In the authentication status detector 2805 and the filtering status manager 2802, the subnet tables 2814 hold current settings.

FIG. 29 illustrates the subnet table 2814 and entries.

The subnet table 2814 contains entries in the following fields: subnet address 2901, subnet mask 2902, IP address of filtering status manager 2903, and IP address of packet communications apparatus 2904. On each entry line, the field of IP address of packet communications apparatus 2904 contains a registration of the IP address of a packet communications apparatus 2801 to which an IP subnet is linked that has an address given by the AND of a subnet address value registered in the subnet address field 2901 and a subnet mask value registered in the subnet mask field 2902. The field of IP address of filtering status manager 2903 contains a registration of the IP address of the filtering status manager 2802 that issues a directive to the packet communications apparatus 2801 whose IP address is registered in the IP address field 2904. Because only one filtering status manager 2802 exists in the network system, the same IP address is registered in the field of IP address of filtering status manager 2903 on all entry lines in the subnet table 2814. It is possible that a plurality of filtering status managers 2802 are used in the network system and the appropriate one of their IP addresses is registered in the field on the entry lines in the subnet table 2814, thus distributing the processing load between or among the filtering status managers 2802. When a login by a user is detected, the authentication status detector 2805 searches the subnet table 2814 for the IP subnet to which the IP address of the user terminal 2806 operated by the user belongs and determines the filtering status manger 2802 to which notice of the user login is to be sent from the IP subnet address entry searched out. Similarly, the filtering status manager 2802 determines a packet communications apparatus 2801 to which notice of the IP address of the logged-in user terminal is to be sent from the contents of the subnet table 2814.

No entry exists in the learned address table 2811 that each of the packet communications apparatuses A to C 2801 has. The contents of the learned address table 2811 will be described later.

FIG. 30 illustrates the address for authentication table 2813 and entries.

In the address for authentication table 2813, the IP addresses of the servers 2803 having the user authentication unit 2804 are registered. In addition, the IP address of equipment that provides a function required for user authentication (for example, Domain Name System (DNS)) may be registered. In the address for authentication table 2813 illustrated in FIG. 30, the IP addresses of the servers A to C 2803 are registered. The address for authentication table 2813 may be used to register the IP address of a server that holds information that may be opened to users who are not yet authenticated.

FIG. 31 is the out-of-authentication address table 2812 on the packet communications apparatus A 2801 and entry.

In the out-of-authentication address table 2812, a MAC address of information equipment that users can access without being user-authenticated is registered. Information equipment to be registered in the out-of-authentication address table 2812 includes packet communications apparatus such as a router, equipment such as a printer that is unable to perform voluntary user authentication (login), etc. The MAC address of such equipment is registered in the out-of-authentication address table 2812 on the packet communications apparatus connected to the network to which the equipment is also connected. In the out-of-authentication address table 2812 illustrated in FIG. 31, among the NIFs of the router 2820, the MAC address of the NIF linked to the packet communication apparatus A 2801 is registered.

If the user terminal 2806 is connected to the network ports system 2830 in the state of the above-described initial settings, the user terminal 2806 is only permitted to communicate with the DHCP server 2807, perform Address Resolution Protocol (ARP) communication with the router 2820, and communicate with the user authentication unit 2804. Other communication, if attempted, is filtered by the packet communications apparatus A 2801. Filtering is discarding the packet for communication that is not permitted.

Figure 33:
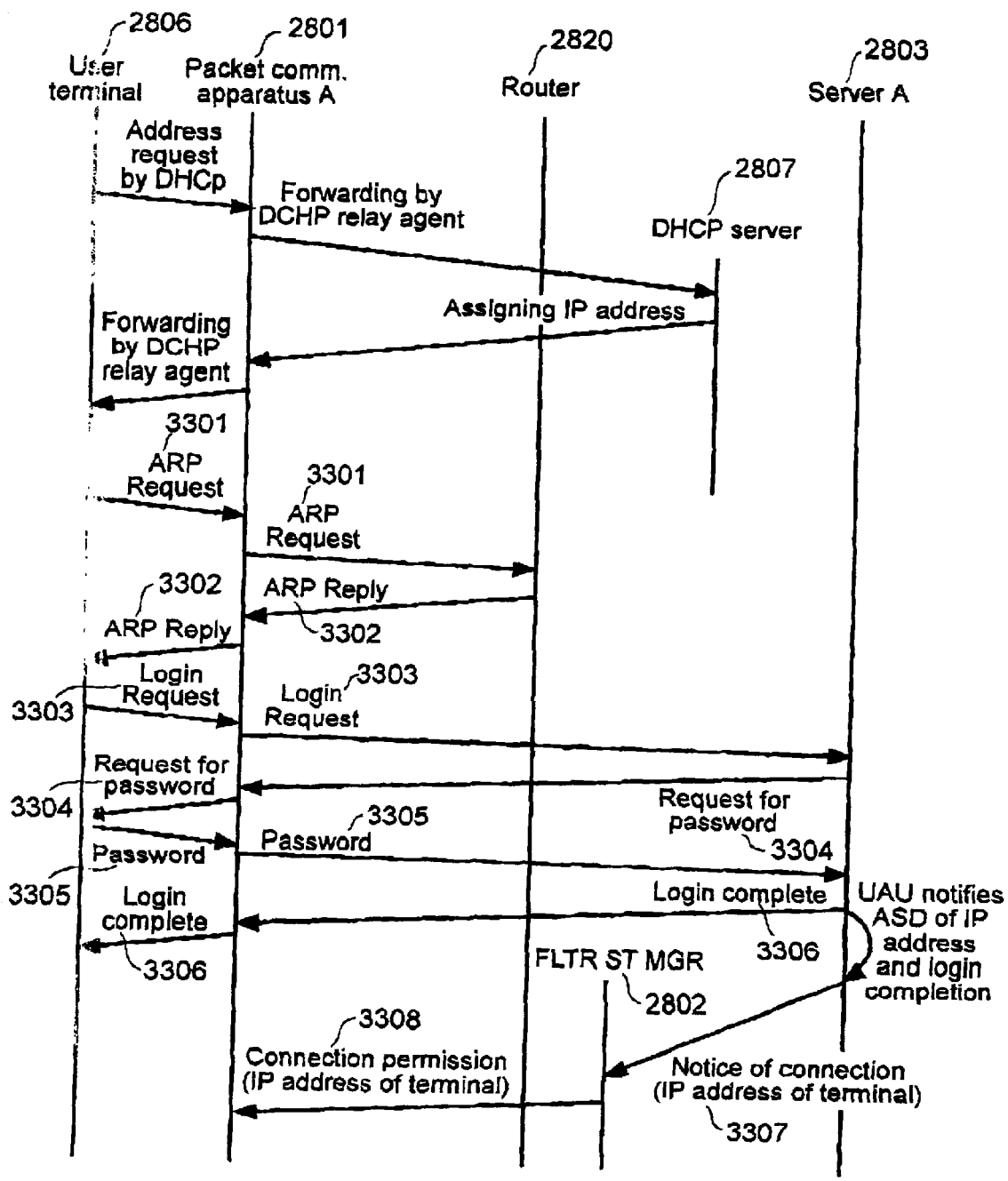
FIG. 33 a diagram of communication sequence after the connection of a user terminal 2806 to a network in a network ports system 2830.

In the network system shown in FIG. 28, assume that the user has now connected the user terminal 2806 to the network (IP subnet 147. 3.3.0) in the network ports system 2830 and request for user authentication (login) is issued from the user terminal 2806. A diagram of communication sequence thereof is shown in FIG. 33.

It is assumed that the user terminal 2806 communicates with the server A 2803 to gain authentication (login to the server) and that IP address 137.1.1.1 of the server A is known to the user terminal 2806 or the user of the user terminal 2806.

When the user terminal 2806 has been connected to the network (IP subnet 147. 3.3.0) in the network ports system 2830, it is not assigned an IP address. In the network system shown in FIG. 28, by using DHCP, an IP address is assigned to the user terminal 2806. Means other than using DHCP may be taken in assigning an IP address to the user terminal 2806. For example, the user may set an IP address for the user terminal 2806 by himself or herself. If a means other than using DHCP is taken, the DHCP relay agent function of the packet communications apparatus 2801 is not necessary.

After the user terminal is connected to the network (IP subnet 147. 3.3.0) in the network ports system 2830, first, the user terminal 2806 sends an address request packet for requesting the assignment of an IP address to it by following the DHCP protocol. In this case, the user terminal 2806 sends by broadcast the packet having a broadcast address as the destination address. The address request packet is received by the packet communications apparatus A 2801.

Figure 32:
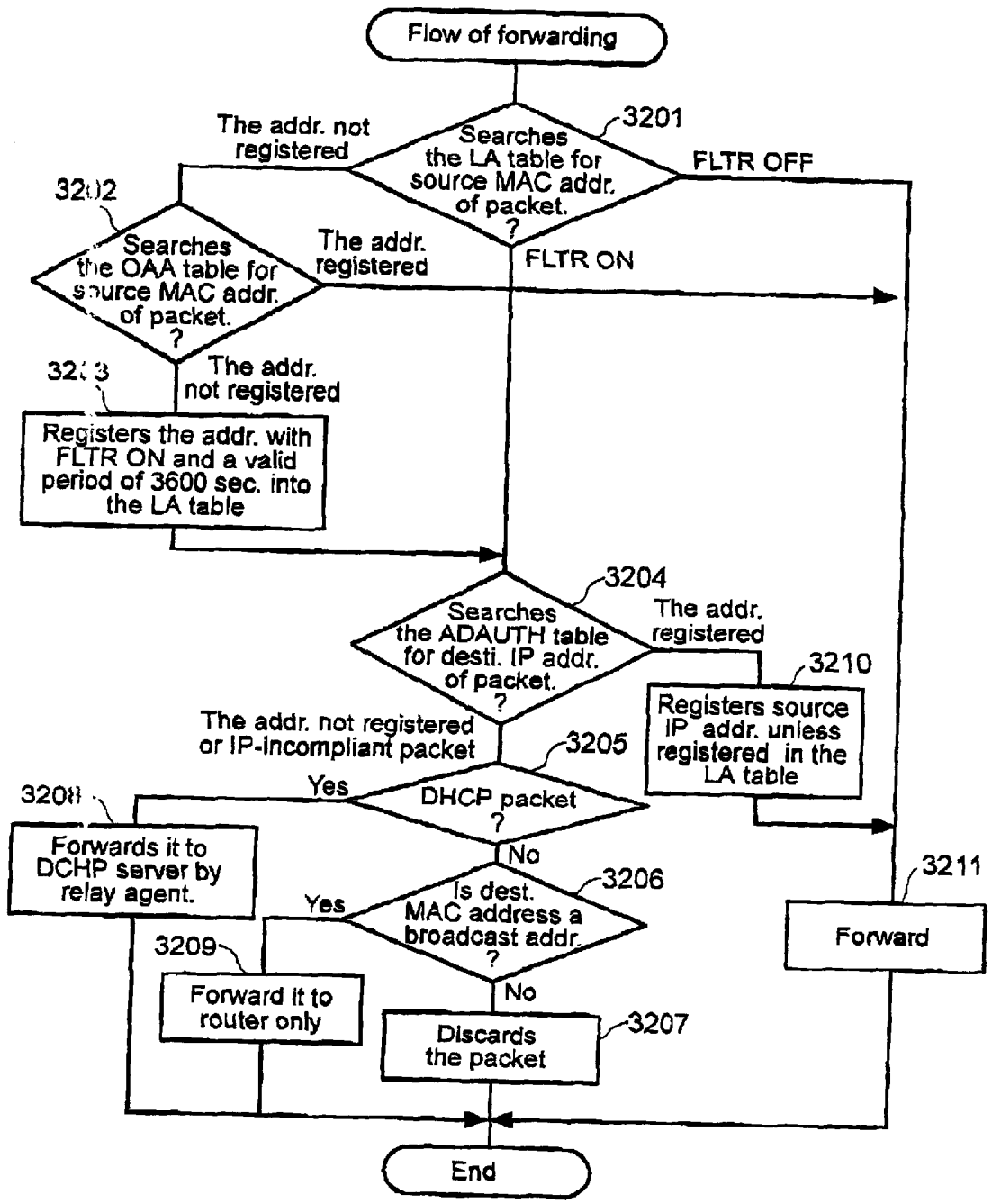
FIG. 32 is a flowchart illustrating how each packet communications apparatus forwards a packet.

FIG. 32 is a flowchart illustrating how each packet communications apparatus A to C 2801 forwards a packet it received.

Upon receiving the address request packet from the user terminal 2806, the packet communications apparatus A 2801 searches the learned address table 2811 for the source MAC address (22:22:00:11:11:11) included in the packet (step 3201). Since no entry exists in the learned address table 2811 in the initial state, the apparatus searches the out-of-authentication address table 2812 for the source MAC address of the packet (step 3202). As illustrated in FIG. 31, however, only the MAC address of the router 2820 is registered in the out-of-authentication address table 2812. It is thus apparent that the source MAC address included in the packet from the user terminal 2806 is not registered in the above tables. Accordingly, the packet communications apparatus A 2801 registers the source MAC address into the learned address table 2811 as one entry.

Then, the packet communications apparatus A 2801 searches the address for authentication table 2813 to attempt to find out the destination IP address of the address request packet (step 3204). Because the destination address of the address request packet is a broadcast address, however, it is not registered in the address for authentication table 2813. Then, the packet communications apparatus A 2801 judges whether the received packet is the one for address request by following DHCP (step 3205). Since the received packet is the address request packet, the packet communications apparatus A 2801 forwards the address request packet to the DHCP server 2807 via the router 2820 by the DHCP relay agent function (step 3208).

Referring to FIG. 33, the DHCP server 2807 receives the address request packet and assigns an IP address to the user terminal 2806. The DHCP server 2807 assigns the user terminal 2806 an IP address (147.3.3.1) belonging to the network (IP subnet 147.3.3.0) to which the user terminal 2806 is now connecting. Then, the DHCP server sends an address leasing packet for notifying the user terminal 2806 of the assigned IP address. At this time, in the address leasing packet, the DHCP server includes IP address 1473.3.251 of the router 2820 as the address of a default gateway for the network (IP subnet 147.3.3.0) to which the user terminal 2806 is now connecting, thus notifying the user terminal 2806 of that IP address. Notification of the IP address 147.3.3.251 of the router 2820 may be sent to the user terminal 2806, using a different packet from the address leasing packet. Other means for setting the default gateway address held on the user terminal 2806 may be used for example, setting it by user input). The router 2820 forwards the address leasing packet to the packet communications apparatus A 2801. The packet communications apparatus A 2801 handles the received packet in the same way as described above and send the address leasing packet to the destination, MAC address (22:22:00:11:11:11) of the user terminal by the DHCP relay agent function. Thereby, the IP address (147.3.3.1) is assigned to the user terminal 2806.

Next, a procedure in which the user terminal 2806 issues request for authentication (login) to the user authentication unit 2804 of the server A 2803 will be explained below.

After being assigned the IP address, the user terminal 2806 attempts to gain authentication (login to the server) by issuing request for authentication (login) to the user authentication unit on the server A 2803. Because the user terminal 2806 and the server A belong to different networks (IP subnets), communication between both is performed via the router 2820.

Referring to FIG. 33 again, the user terminal 2806 sends by broadcast an ARP Request packet 3301 including a broadcast address as the destination address to obtain a MAC address associated with the IP address (147.3.3.251) of the default gateway, notification of which it received from the DHCP server. The ARP request packet 3301 includes the MAC address of the user terminal 2806 as the source MAC address and the IP address thereof as the source IP address.

The ARP Request packet 3301 is received by the packet communications apparatus A 2801. Upon receiving the ARP Request packet 3301, the packet communications apparatus A 2801 first executes a process of learning the ARP packet and then executes the process of forwarding the ARP Request Packet 3301.

Figure 34:
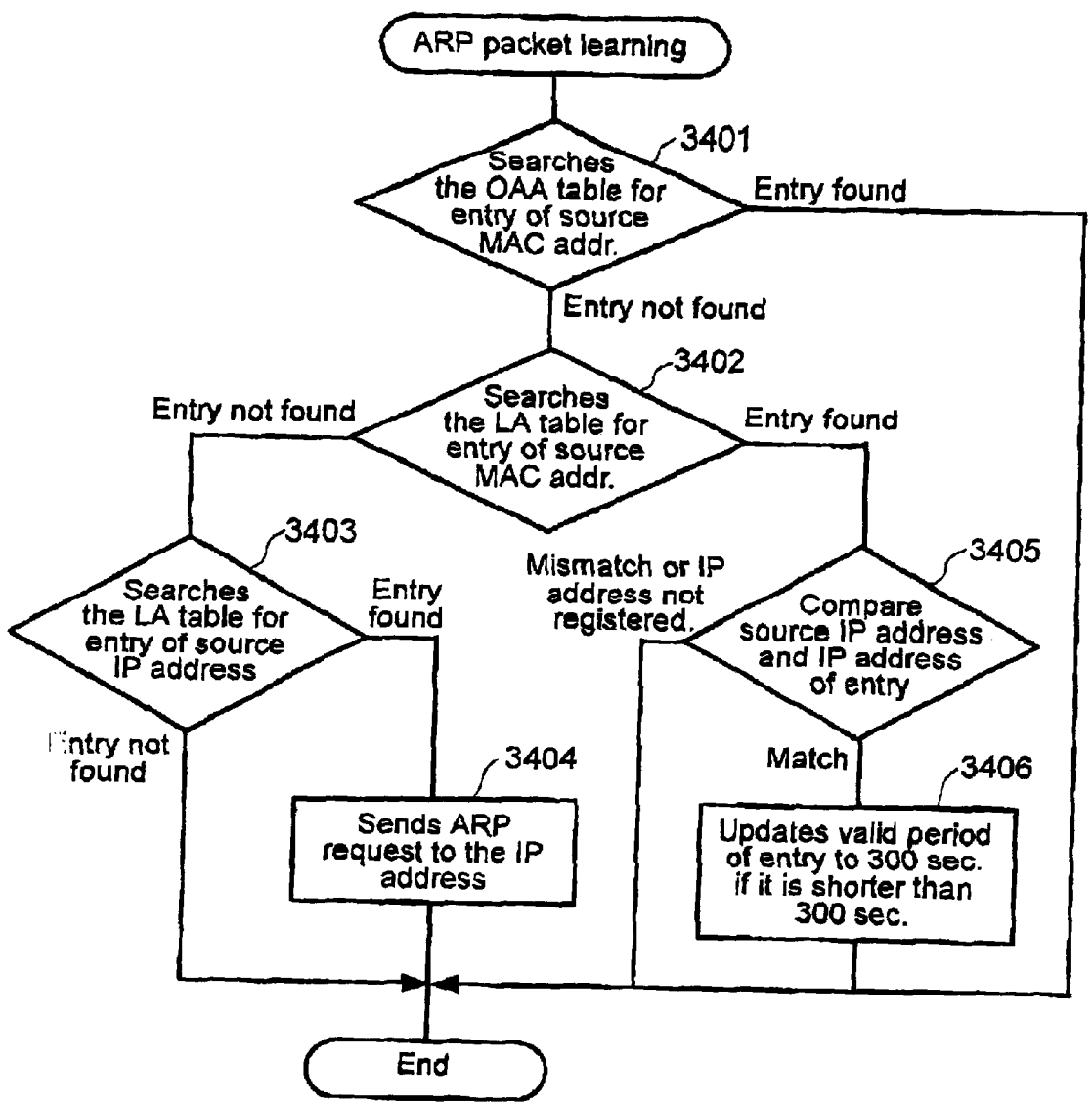
FIG. 34 is a flowchart illustrating an ARP packet learning process to be executed by each packet communications apparatus 2801.

FIG. 34 is a flowchart illustrating the ARP packet learning process to be executed by each packet communications apparatus A to C 2801.

In the ARP packet learning process, the packet communications apparatus A 2801 first searches the out-of-authentication address table 2812 for the source MAC address included in the ARP Request packet 3301 (step 3401). The entry of the source MAC address does not exist in the out-of-authentication address table 2812 because only the MAC address of the router 2820 is registered in the table 2812 as illustrated in FIG. 31. Then, the packet communications apparatus A 2801 searches the learned address table 2811 for the source MAC address (step 3402). Nothing is registered in the learned address table 2811 on the packet communications apparatus A 2801 in the initial state. Thus, the entry of the source MAC address does not exist in the learned address table 2811 also. Then, the packet communications apparatus A 2801 searches the learned address table 2811 for the source IP address included in the ARP Request packet 3301 (step 3403). Since nothing is registered in the learned address table as described above, the entry of the source IP address does not exist in the learned address table 2811. Accordingly, the packet communications apparatus A 2801 terminates the ARP packet learning process.

Then, the packet communications apparatus A 2801 carries out the process of forwarding the ARP Request packet 3301, according to the flowchart shown in FIG. 32. First, the packet communications apparatus A 2801 searches the learned address table 2811 for the source MAC address included in the ARP Request packet 3301 (step 3201). Since nothing is registered in the learned address table 2811 as described above, the packet communications apparatus A 2801 searched the out-of-authentication address table 2812 for the source MAC address (step 3202). The out-of-authentication address table 2812 has only the MAC address registration of the router 2820 illustrated in FIG 31, but does not have the entry of the source MAC address of the packet. Thus, the packet communications apparatus A 2801 registers the source MAC address into the learned address table 2811 (step 3203).

FIGS. 35, 36, and 37 illustrate the learned address table 2811 and entries.

The learned address table contains entries in the following fields: MAC address, IP address, status, and valid period. In the MAC address field on an entry line, the MAC address of the user terminal 2806 connected to the packet communications apparatus 2801 is registered. In the IP address field, the IP address assigned to the user terminal 2806 is registered whose MAC address is registered on the same entry line. If the IP address of the user terminal 2806 is unknown or unassigned, a value of "0.0.0.0" is registered in the IP address field. In the status field, information (filtering ON) indicating discarding a packet whose source MAC address matching the MAC address registration on the same entry line or information (filtering OFF) indicating forwarding that packet is registered. In the valid period field, the remaining time (valid time) in units of seconds before the validity of the entries on the line expires is registered.

As described above, the packet communications apparatus A 2801 registers the MAC address (22:22:00:11:11:11) of the user terminal 2806 that is the source address of the ARP Request packet into the MAC address field of the learned address table 2811, "0.0.0.0" into the IP address field, information "filtering ON" indicating discarding the packet into the status field, and "3600 sec." into the valid period field. The learned address table and the entries in this state are illustrated in FIG. 35.

The time of "3600 sec." equals time allowed to pass before the entry line is deleted from the learned address table 2811 if the user terminal 2806 connected to the network remains unassigned an IP address and without issuing request for authentication (login). Arbitrary time other than "3600 sec" can be set for the entry valid period if it is longer than the time required for IP address assignment and authentication (login) processes. If the valid period is shorter than the valid period of information to be retained is an ARP cache provided on equipment connected to the same network that includes the packet communications apparatus 2801, there is a possibility of data inconsistency between the packet communications apparatus 2801 and that equipment occurring. Therefore, the entry valid period must be longer than the valid period of information to be retained in the ARP cache.

Then, the packet communications apparatus A 2801 searches the address for authentication table 2813 for the destination IP address included in the ARP Request packet 3301 (step 3204). Since the ARP Request packet 3301 is, however, not an IP packet, judgment is made as to whether the ARP Request packet 3301 is a DHCP packet (step 3205). Since the ARP Request packet 3301 is not a DHCP packet, judgment is made as to whether the destination MAC address included in the ARP Request packet 3301 is a broadcast address (step 3206). Since the destination MAC address is a broadcast address, the packet communications apparatus A 2801 forwards the ARP Request packet 3301 to the router 2820 only (step 3209).

The router 2820 receives the ARP Request packet 3301 and sends back an ARP Reply packet 3302. The ARP Reply packet 3302 includes the MAC address (22:22:00:00:00:03) of the router 2820 as the source MAC address and the IP address (147.3.3.251) thereof as the source IP address.

The packet communications apparatus A 2801 receives the ARP Replay packet 3302 and carries out the ARP packet learning and forwarding processes as will be explained below.

In the ARP packet learning process, the packet communications apparatus A 2801 first searches the out-of-authentication table 2812 for the source MAC address included in the ARP Reply packet 3302 (step 3401). As illustrated in FIG. 31, the MAC address of the router 2820 is registered in the out-of-authentication table 2812. Thus, the packet communications apparatus A 2801 finds out the MAC address entry of the router 2820 matching the source MAC address of the packet from the out-of-authentication table 2812 and terminates the ARP packet learning process.

According to the flowchart shown in FIG. 32, then, the packet communications apparatus A 2801 searches the learned address table 2811 for the source MAC address included in the ARP Reply packet 3302 (step 3201). Since the MAC address of the router 2820 is not registered in the learned address table 2811, the packet communications apparatus A 2801 searched the out-of-authentication table 2812 for the source MAC address (step 3202). Since the source MAC address, namely, the MAC address of the router 2820 is registered in the out-of-authentication table 2812, the packet communications apparatus A 2801 forwards the ARP Replay packet 3302 (step 3211), thus sending it to the user terminal 2806. The user terminal 2806 receives the ARP Replay packet 3302 and memorizes the MAC address of the router 2820.

To gain authentication (login to the server), the packet communications apparatus A 2801 sends a login request packet 3303 to the user authentication unit 2804 on the server A 2803. The login request packet 3303 includes the IP address of the server A 2803 as the destination IP address, the MAC address of the router 2820 as the destination MAC address, the MAC and IP addresses of the user terminal 2806 as the source MAC and IP addresses. The packet communications apparatus A 2801 receives the login request packet 3303, and according to the flowchart shown in FIG. 32, searches the learned address table 2811 for the source MAC address included in the login request packet 3303 (step 2801). The MAC address of the user terminal 2806 has already been registered in the learned address table 2811. Then, the packet communications apparatus A 2801 refers to the status field on the entry line on which the source MAC address is registered. Since "filtering ON" is specified in the status field as illustrated in FIG. 35, the packet communications apparatus A searches the address for authentication table 2813 for the destination address included in the login request packet 3303 (step 3204). Since the IP address of the server A 2803 is registered in the address for authentication table 2813, the packet communications apparatus A 2801 sees whether the source IP address included in the login request packet 3303 is registered in the learned address table 2811. The IP address field on the entry line on which the MAC address of the user terminal 2806 has been registered contains registration "0.0.0.0" as illustrated in FIG. 35 and the IP address of the user terminal 2806 is not registered. Thus, the packet communications apparatus A 2801 registers the source IP address, namely IP address (147.3.3.1) of the user terminal 2806 into the IP address field (step 3210). In this case, the packet communications apparatus A 2801 does not change the time value held in the valid period field.

FIG. 36 illustrates the learned address table and entries in this state.

Then, the packet communications apparatus A 2801 forwards the login request packet 3303 (step 3211), thus sending it to the router 2820. The router 2820 forwards the login request packet 3303 to the server A 2803.

When the server A 2803 receives the login request packet 3303, the user authentication unit 2804 on the server 2803 sends the user terminal 2806 a password request packet 3304 for requesting password input. The router 2820 forwards the password request packet 3304 to the packet communications apparatus A 2801. At this time, the router 2820 changes the source MAC address included in the password request packet 3304 to the MAC address of the router 2820 and sends the packet. The packet communications apparatus A 2801 receives the password request packet 3304. According to the flowchart shown in FIG. 32 and in the same way as for forwarding the ARP Reply packet 3302, the packet communications apparatus A 2801 searches the learned address table 2811 and the out-of-authentication address table 2812 for the source address included in the password request packet 3304 (steps 3201 and 3202). Since the source MAC address, namely the MAC address of the router 2820 is registered in the out-of-authentication address table 2812, the packet communications apparatus A 2801 forwards the password request packet 3304 (step 3211), thus sending it to the user terminal 2806. When the user terminal 2806 receives the password request packet 3304, the user operating the user terminal 2806 is prompted to input a password. The user inputs a password to the user terminal 2806. The user terminal 2806 sends a packet 3305 including the input password. The packet communications apparatus A 2801 receives the packet 3305, and in the same way as for forwarding the login request packet 3303, searches the learned address table 2811 for the source MAC address included in the packet 3305 (step 3201) and searches the address for authentication table 2813 for the destination IP address included in the packet 3305 (step 3204). Since the destination IP address, namely the IP address of the server A 2804 is registered in the address for authentication table 2813 and the source IP address, namely the IP address of the user terminal 2806 is also registered in the learned address table 2811 (step 3210), the packet communications apparatus A 2801 forwards the packet 3304, thus sending it to the router 2820. The router 2820 forwards the packet 3305 to the serer A 2803.

When the server A 2803 receives the packet 3305, the user authentication unit 2804 compares the password included in the packet 3305 with the password pre-registered for user identification and retained as a user account 2840 to see whether the password is correct. When the user authentication unit 2804 verifies that the password included in the packet 3305 is correct, it permits the user terminal 2806 to login to the server. The user authentication unit 2804 sends the user terminal 2806 a login complete packet 3306 as notice of login completion and notifies the authentication status detector 2805 on the server A 2803 of the IP address (147.3.3.1) of the user terminal 2806 and login completion.

The authentication status detector 2805 searches the subnet table 2814 for an entry line on which an address given by the AND of the subnet mask value held in the subnet mask field 2902 and the IP address of the user terminal 2806 equals the subnet address held in the subnet address field 2901. When the authentication status detector 2805 finds out such entry line, it sends a packet for notice of connection 3307 including the IP address of the user terminal 2806, addressing it to the IP address registered in the field 2903 of IP address of filtering status manager on the entry line. In the subnet table illustrated in FIG. 29, for example, entry #3 includes the subnet address of the network (IP subnet) to which the user terminal 2806 is now connecting and matches the above-described entry line. Accordingly, from the entry #3 line, it is appreciated that the IP address of the filtering status manager 2802 to which the packet for notice of connection 3307 is to be sent is "137.2.2.100."

The router 2820 forwards the packet for notice of connection 3307 to the filtering status manager 2802. When the filtering status manager 2802 receives the packet for notice of connection 3307, it searches the subnet table 2814 for an entry line on which an address given by the AND of the subnet mask value held in the subnet mask field 2902 and the IP address of the user terminal 2806 derived from the notice packet equals the subnet address held in the subnet address field 2901. When the filtering status manager finds out such entry line, it knows what IP address is held in the field 2904 of IP address of packet communications apparatus on the entry line. Since entry #3 in the subnet table illustrated in FIG. 29 matches such entry line, it is appreciated that the IP address of the packet communications apparatus (IP address of packet communications apparatus A 2801) is "147.3.1.220." The filtering status manager 2802 sends a packet for connection permission 3308 including the IP address (147.3.3.1) of the user terminal 2806, addressing it to the packet communications apparatus A 2801 having the IP address known as above.

Upon receiving the packet for connection permission 3308, the packet communications apparatus A 2801 searches the learned address table 2811 for the IP address (147.3.3.1) of the user terminal 2806 that it knows from the packet. As illustrated in FIG. 36, the IP address of the user terminal 2806 is registered as one entry in the learned address table 2811, Thus, the packet communications apparatus A 2801 changes the information registered in the status field on the entry line from "filtering ON" to "filtering OFF" and sets "300 sec." to override the time in the valid period field.

FIG. 37 illustrates the learned address table and entries in this state.

Thereafter, upon receiving a packet including the MAC address (22:22:00:11:11:11) of the user terminal 2806 as the source MAC address, the packet communications apparatus 2801 searches the learned address table 2811 for the source MAC address (step 3201), according to the flowchart shown in FIG. 32. In this case, the source MAC address is registered as one entry in the learned address table 2811 and "filtering OFF" is specified in the status field on the entry line. Thus, the packet communications apparatus A 2801 always forwards a packet it received (step 3211). In consequence, the user terminal 2801 can freely communicate with the server as packets sent from the user terminal 2806 are not discarded by the packet communications apparatus 2801.

Then, how the packet communications apparatus A 2801 detects disconnection of the user terminal 2806 from the network and a process thereof will be explained below.

The packet communications apparatus A 2801 periodically activates a process of updating the content of the valid period field on the entry lines in the learned address table 2811. For example, at intervals of 30 seconds, the packet communications apparatus A 2801 activates the process of updating the content of the valid period field. The period in which the process is activated depends on the degree of accuracy of assuring the valid period entry.

The process of updating the valid period field content in the learned address table will be explained below, using FIG. 38.

Figure 38:
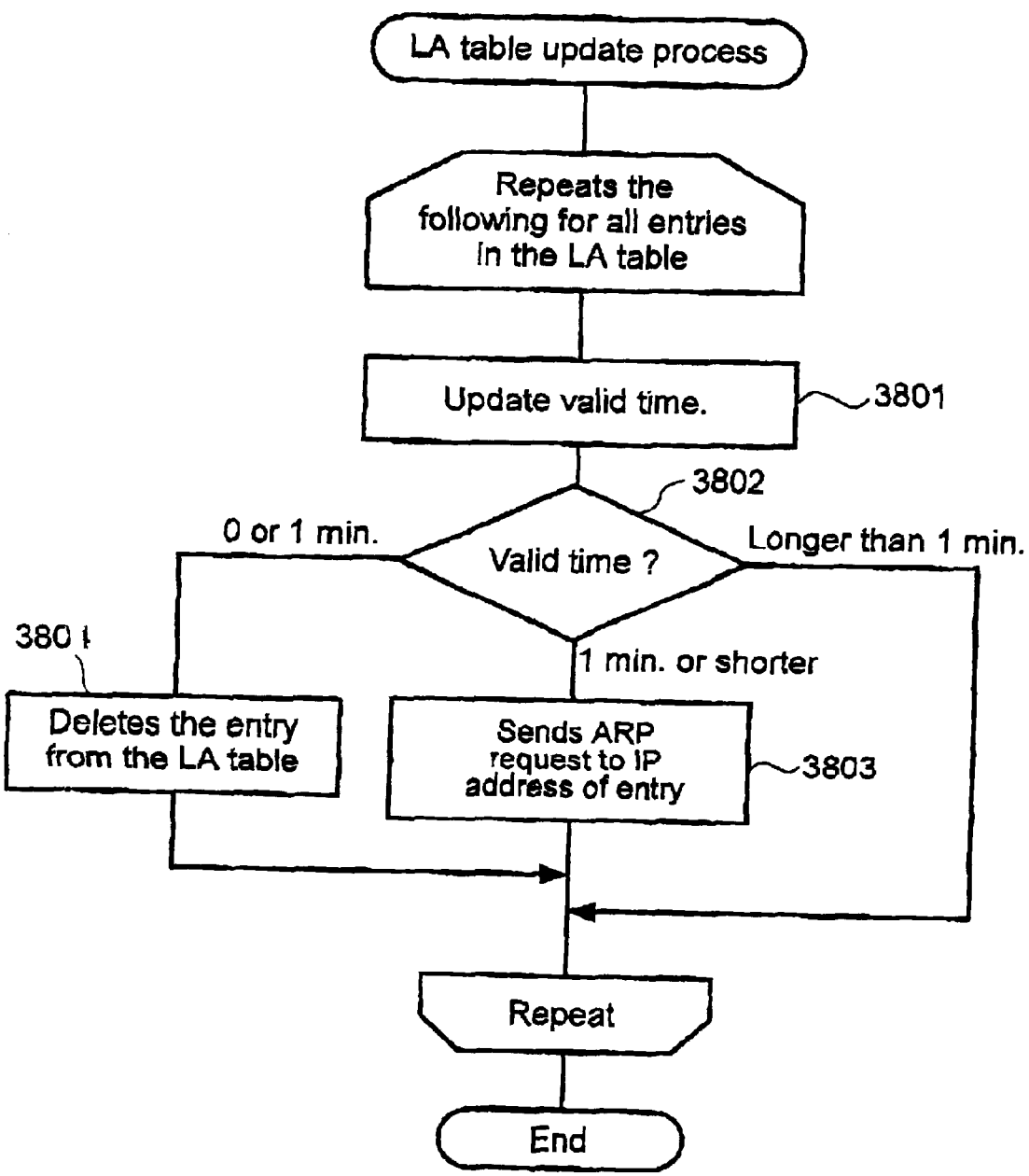
FIG. 38 is a flowchart illustrating a process of updating the learned address table 2811 to be executed by each packet communications apparatus 2801.

FIG. 38 is a flowchart illustrating the process of updating the learned address table 2811 to be executed by each packet communications apparatus A to C 2801.

On the packet communications apparatus A 2801, when the update process of the learned address table 2811 is activated, first, "30 seconds" equaling intervals at which the update process is activated is subtracted from the remaining time (valid time) held in the valid period field on the entry lines in the learned address table 2811 and thus updating the valid time (step 3801). As the result of the subtraction, if the remaining time (updated valid time) held in the valid period field is longer than 60 seconds (double the activation interval time), the packet communications apparatus A 2801 at once terminates the update process without executing further processing for the entry. If there is an entry whereof the updated valid time falls within 60 seconds, but longer than 0 seconds, in order to reconfirm the MAC address of the user terminal 2806 that is assigned the IP address registered on the same entry line, the packet communications apparatus A 2801 sends an ARP Request packet to the IP subnet to which the user terminal 2806 is now connecting (step 3803). If there is an entry whereof the updated valid time is 0 seconds or minus, the packet communications apparatus A 2801 deletes the entry line (step 3804). Thereby, the contents of the learned address table 2811 return to those in the previous state before the user terminal 2806 with MAC address that was registered on the deleted entry line is connected to the network.

While executing the above-described update process, the packet communications apparatus A 2801 sends an ARP Request packet periodically (at intervals of about four minutes during the above update process) to make sure that the user terminal 2806 remains connected to the network. If the user terminal 2806 is connected to the network, an ARP Reply packet in response to the ARP Request packet is sent back from the user terminal 2806. Thus, unless the packet communications apparatus A 2801 receives the reply to the ARP Request packet, it regards the user terminal 2806 as having been disconnected from the network and deletes the entry line thereof from the learned address table when the updated valid time becomes 0 seconds or minus.

Because the packet communications apparatus A 2801 activates the update process at intervals of 30 seconds and sends an ARP Request packet if the updated valid time falls within 60 seconds (double the activation interval time), the ARP Request packet is sent two times before one entry line is deleted from the learned address table. By changing the valid time condition setting for sending ARP Request packets, it is possible to adjust the number of times that the packet communications apparatus A 2801 confirms that the user terminal 2806 remains connected before the entry thereof is deleted from the table.

Furthermore, the packet communications apparatus A 2801 updates the valid time held in the valid period field of the learned address table 2811 by an ARP Request or ARP Reply packet sent from the user terminal 2806. How the packet communications apparatus A 2801 does so will be explained below, using FIG. 34.

Now, assume the following. When the user terminal 2806 was user-authenticated (logged in to the server), initially, the MAC address and IP address of the user terminal 2806, information indicating forwarding packets from/to the terminal, and valid time were registered on one entry line in the learned address table 2811. Moreover, 120 seconds elapsed after the valid time (300 seconds) entry was registered. Thus, the valid time on the entry line is now 120 seconds in the learned address table 2811.

When the packet communications apparatus A 2801 receives an ARP Request or Replay packet sent from the user terminal 2806, it executes the ARP packet learning process, according to the flowchart shown in FIG. 34. The packet communications apparatus A 2801 first searches the out-of-authentication address table 2812 for the source MAC address included in the ARP Request or ARP Reply packet (step 3401). The MAC address of the user terminal 2806 is not registered in the out-of-authentication address table 2812 as illustrated in FIG. 31 Then, the packet communications apparatus A 2801 searches the learned address table 2811 for the source MAC address (step 3402). The source MAC address, namely the MAC address of the user terminal 2806 exists as the MAC address entry in the learned address table 2811. Thus, the packet communications apparatus A 2801 compares the source IP address included in the ARP Request or ARP Reply packet with the source IP address (147.3.3.1) entry registered in the learned address table 2811 (step 3405). Normally, it is not necessary to change the IP address assigned to the user terminal 2806 in the communication ON status, and therefore there is a match between the IP address registered in the learned address table 2811 and the source IP address of the packet. Due to the match, the packet communications apparatus A 2801 updates the valid time entry to 300 seconds if it is shorter than 300 seconds (step 3406) and terminates the ARP packet learning process. Because the valid time entry is now 180 seconds in this example case, it is updated to 300 seconds.

In the manner described above, the packet communications apparatus A 2801 uses an ARP Request or ARP Replay packet sent from the user terminal 2806 is used to update the valid time entry for the terminal in the learned address table 2811. Consequently, the packet communications apparatus A 2801 actually sends an ARP Request packet at longer intervals than the above-mentioned periodical intervals (about four minutes). Thus, the load on the network to which the user terminal 2806 is connecting is reduced. During the communication ON status of the user terminal 2806, an ARP Request or ARP Reply packet is sent from the user terminal 2806 at regular or irregular intervals, Therefore, the packet communications apparatus A 2801 sends an ARP Request packet to the user terminal 2806 only after the elapse of a certain time when the user terminal 2806 remains in the communication OFF status, that is, it is likely that the user terminal 2806 has been disconnected from the network.

As described above, by using the packet communications apparatus 2801 in the network system including the network ports system that allows end users to freely connect their terminal thereto, packets from a user terminal 2806 that is not yet user-authenticated (logged-in) are discarded, thereby preventing unauthorized users from unfairly using networking service.

The foregoing invention has been described in terms of preferred embodiments. However, those skilled, in the art will recognize that many variations of such embodiments exist. Such variations are intended to be within the scope of the present invention and the appended claims.

What is claimed is:

1. A packet communications apparatus to be used in a network system wherein user terminals that can be linked via a network to said apparatus send/receive packets to/from a server for authentication and a file server connected via a network to said apparatus, comprising:

a plurality of network interfaces;

a learned address table containing information for identifying one of said network interfaces through which to send a packet;

a packet forwarding unit that selects a port through which to forward a packet by referring to said learned address table, according to the state of said network interfaces, and forwards or discards a packet sent from the user terminal, addressed to the server for authentication/file server and vice versa;

a processor for directive packets to change state that receives a directive packet to change state, the packet holding a directive to change the state of a specific network interface to one of the connected state, disconnected state and stateless, via said packet forwarding unit from the server for authentication; and state managers, each installed in each network interface and each that receives a directive packet to change state from said processor for directive packets to change state and changes the state of the network interface to one of the connected state, disconnected state and stateless, according to the directive packet to change state.

2. The packet communications apparatus according to claim 1, wherein:

said network system further includes a server for address assignment that dynamically leases an address to a user terminal linked to it via a network or networks and a router;

said apparatus further includes a filtering table in which the source address of a packet it received is registered;

said processor for directive packets to change state, upon receiving a directive packet to change state that directs it to register a specific address registered in said filtering table into said learned address table, registers the specific address into the learned address table; and said apparatus unconditionally forwards a packet whose destination address is registered in the learned address table and forwards a packet whose destination address is registered in said filtering table, but not registered in the learned address table, provided the source address of the packet is the router or the server for authentication.

3. The packet communications apparatus according to claim 1, wherein:

each of said network interfaces further includes a link down detector that finds whether a network link terminated to the interface is now workable;

each of said state managers, when said line down detector detect a link-down, changes the state of the network interface in which the link-down has now been detected to the disconnected state;

each of said state managers, when a user terminal is user-authenticated by said server for authentication, changes the state of the network interface to which the user terminal is linked to the connected state, and said packet forwarding unit, upon receiving a packet through a network interface set in the disconnected state, does not forward the packet to a network interface set in the disconnected or connected state, but forwards the packet to only a specific network interface, and upon receiving a packet through a network interface set in the connected state, does not forward the packet to a network interface set in the disconnected state.

4. A packet communications apparatus to be used in a network system wherein user terminals that can be linked via a network to said apparatus send/receive packets to/from a server for authentication and a file server connected via a network to said apparatus, comprising:

physical interfaces, each making the connection to a network;

a packet forwarding unit that selects a port through which to forward a packet;

filtering units that perform packet filtering, each located between each of said physical interfaces and the packet forwarding unit and comprising a filtering table containing information for forwarding or discarding a packet and a packet processor that discards a packet or transfers a packet to said packet forwarding unit, according to the contents of said filtering table; and a processor for directives to change filtering that transfers a directive to change filtering from said server for authentication to the appropriate one of said filtering units, changes the information in the filtering table initially set to discard all received packets, according to the directive from said server for authentication, and sequentially adds information for forwarding such packets to said file server that include the address of a user terminal that has now been user-authenticated by said server for authentication as the source address to said filtering table.

* * * * *